(12) United States Patent
Taylor

(10) Patent No.: US 10,625,658 B2
(45) Date of Patent: Apr. 21, 2020

(54) SECURITY SENSOR

(71) Applicant: Process4, Inc., Chagrin Falls, OH (US)

(72) Inventor: Curtis Taylor, Chagrin Falls, OH (US)

(73) Assignee: Process4, Inc., Chagrin Falls, OH (US)

( * ) Notice: Subject to any disclaimer, the term of this patent is extended or adjusted under 35 U.S.C. 154(b) by 0 days.

(21) Appl. No.: 16/022,301

(22) Filed: Jun. 28, 2018

(65) Prior Publication Data

US 2019/0001863 A1 Jan. 3, 2019

Related U.S. Application Data

(60) Provisional application No. 62/526,030, filed on Jun. 28, 2017.

(51) Int. Cl.
| | |
|---|---|
| *B60P 7/08* | (2006.01) |
| *G08B 13/06* | (2006.01) |
| *H04W 4/70* | (2018.01) |
| *G01L 5/101* | (2020.01) |
| *G08B 13/12* | (2006.01) |
| *H04W 4/80* | (2018.01) |

(52) U.S. Cl.
CPC ............ *B60P 7/0861* (2013.01); *G01L 5/101* (2013.01); *G08B 13/06* (2013.01); *H04W 4/70* (2018.02); *G08B 13/126* (2013.01); *H04W 4/80* (2018.02)

(58) Field of Classification Search
CPC .......... H04W 4/70; G01L 5/101; G08B 13/06; B60P 7/0861; B60P 7/0869
USPC .................................... 340/668; 410/97, 100
See application file for complete search history.

(56) References Cited

U.S. PATENT DOCUMENTS

| | | | |
|---|---|---|---|
| 7,112,023 B1* | 9/2006 | Tardif ................... | B60P 7/0861 340/440 |
| 2009/0135015 A1* | 5/2009 | Dobson ................. | E05C 19/186 340/572.9 |
| 2010/0158629 A1* | 6/2010 | Morland ............... | B60P 7/0861 410/98 |
| 2011/0211930 A1* | 9/2011 | Digman ................ | B60P 7/0815 410/115 |
| 2013/0162420 A1* | 6/2013 | Stoddard ............... | B60P 7/0861 340/425.5 |
| 2018/0300675 A1* | 10/2018 | Arena ................. | G06Q 10/0832 |
| 2018/0308045 A1* | 10/2018 | Arena ................ | G06Q 10/0832 |

* cited by examiner

*Primary Examiner* — Joseph H Feild
*Assistant Examiner* — Sharmin Akhter
(74) *Attorney, Agent, or Firm* — Fay Sharpe LLP

(57) ABSTRACT

A device and method are disclosed for sensing the tension of a securing member and generating a signal indicative of a loose securing member when the tension of the securing member drops below a threshold level. The device can further include features for detection of tampering with either the device itself or the tensioning members.

24 Claims, 25 Drawing Sheets

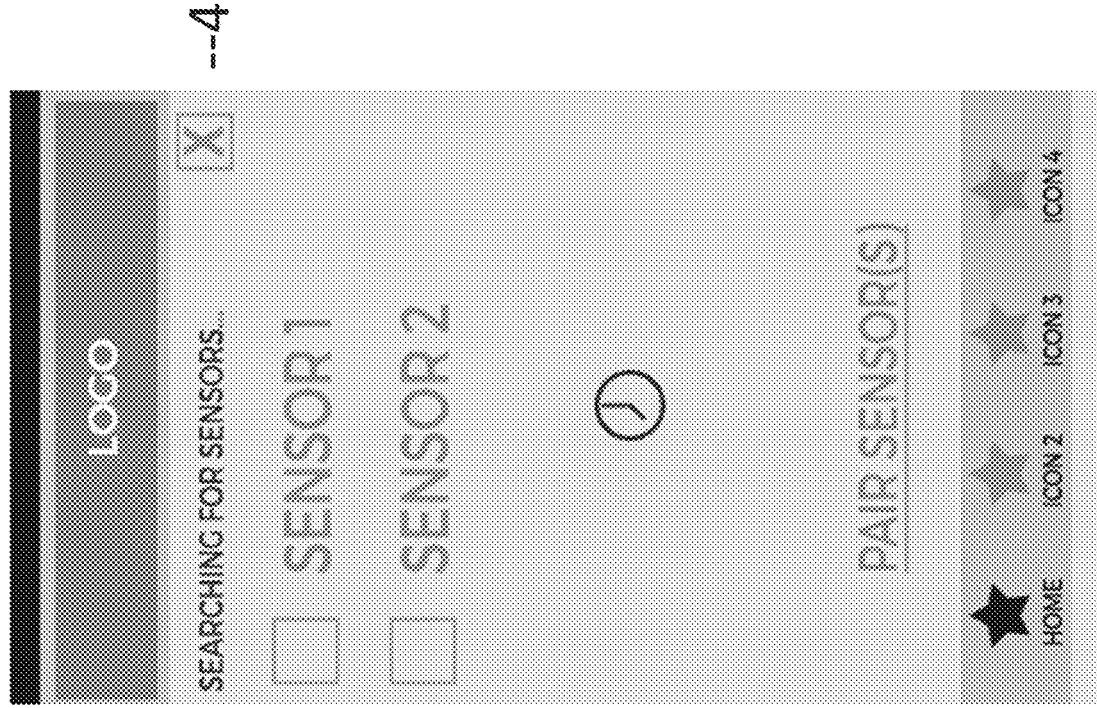
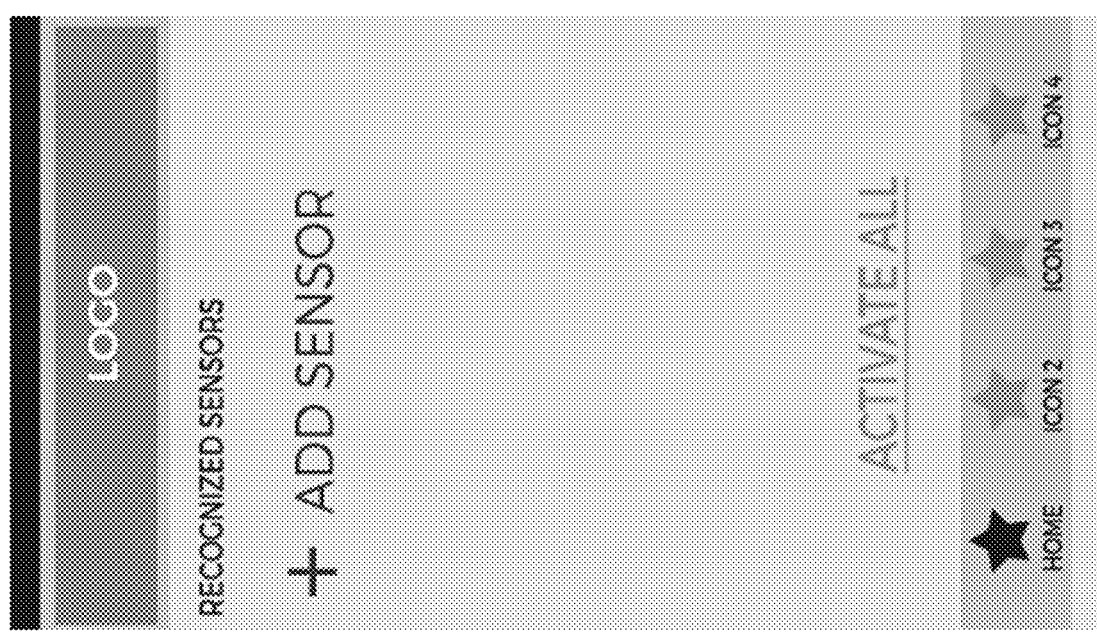
FIG. 19A
FIG. 19B

SECURITY SENSOR

CROSS REFERENCE TO RELATED APPLICATIONS

This application claims priority to U.S. Provisional Application No. 62/526,030, filed Jun. 28, 2017, the disclosure of which is herein incorporated by reference in its entirety.

BACKGROUND

The present invention relates to sensor systems and more particularly to a sensor system to determine the status of a tension arrangement or locking arrangement. In one particular configuration, the security sensor is in the form of a tension sensor for a securing member. Such an arrangement finds particular application in conjunction with straps for securing cargo, and will be described with particular reference thereto. However, it is to be appreciated that the present exemplary embodiment is also amenable to other like applications. In another particular configuration, the security sensor is in the form of a lock sensor used in association with a locking device. Such arrangement finds particular application in conjunction with locks (e.g., pad locks, etc.) for locking chains, lockers, cabinets, etc.

Straps, ropes, chains and other tethers, hereinafter collectively referred to as securing members, are often used for securing loads on trucks and other vehicles during transport. Often, such securing members include a tensioning mechanism, in the form of a ratchet, turnbuckle, binder or the like, for applying tension to the securing member to tightly secure a load. In the past, an operator would initially install one or more securing members around the load, tension securing members to secure the load, and then begin transporting the load.

Various causes can result in the securing members becoming loose. In some instances, road conditions (vibrations, jarring, etc.) can be sufficient to shift a load such that one or more of the securing members becomes loose. In other instances, the tensioning mechanism may fail. In still other instances, the securing members may be cut or loosened through an act of sabotage or vandalism. An unsecure load can result in the load shifting causing the vehicle to become unstable. In extreme cases, the load may fall of the truck or other vehicle, presenting obvious hazards.

Regardless of the cause of the securing members loosening, prudent operators in the past would periodically stop and check the securing members to ensure that the load remained secure on the truck or other vehicle. The process of stopping to check the straps can add to transport costs in both time and expense, while a failure to properly maintain the load on the truck which results in an accident can increase liability.

In view of the current state of the art, there is a need for a security system that can be easily and conveniently used to monitor a securing arrangement to ensure that a load is properly secured to a vehicle.

BRIEF DESCRIPTION

The present invention is directed to a device and method for sensing the tension of a securing member (e.g., a belt, a chain, a rope, a cord, a strap, a tether, etc.) and generating a signal indicative of a loose tensioning member when the tension of the securing member drops below a threshold level are disclosed herein. The device can further include features for detection of tampering with either the device itself or the tensioning members. In some non-limiting embodiments, the device includes wireless communication circuitry for transmitting data such as the signal indicative of a loose tensioning strap or a signal indicative of tampering. The device is easily secured to straps or other tensioning members prior to, or after tensioning of the same. As such, the device remains secured to the tensioning member whether tension is present or not.

In one non-limiting embodiment of the present disclosure, a device for monitoring a securing member is disclosed. The device includes a housing and a sensor and circuitry disposed in the housing, the sensor and circuitry being configured to generate a signal indicative of a state of the securing member.

According to some aspects of the non-limiting embodiments of the present disclosure, the device can further include a cam latch, a compression member coupled to the cam latch, and a biasing member. The sensor includes a normally open switch held in a closed state when the securing member has tension above a threshold, and the signal indicative of a state of the securing member includes a signal indicative of low and/or no tension in the securing member. The housing can include a slot for receiving the securing member and the switch can be configured in the closed state when the securing member is received in the slot and the cam latch is moved to a latched position.

According to other aspects of the non-limiting embodiments disclosed herein, the sensor and circuitry of the device are configured to generate a signal indicative of a state of the device itself, and the sensor includes a normally open switch held in an open state when the device is in an unarmed positioned and held in a closed state when the device is in an armed position, and the signal indicative of a state of the device includes a signal indicative of the device being in the unarmed or armed position. The cam latch and compression member can be configured to move the biasing member between the armed position and the disarmed position, with the biasing member being compressed against the securing member when the cam latch is in the armed position.

According to additional aspects of the non-limiting embodiments of the present disclosure, the housing of the device can further include a lower housing having a cylindrical threaded flange, an upper housing including a threaded portion configured to engage the cylindrical threaded flange of the lower housing, and a tether joining the upper and lower housing.

According to some aspects of the non-limiting embodiments, the sensor of the device includes a spring-loaded piston supported by the upper housing and held in an inactive state when the securing member has tension above a threshold and an active state when the securing member has low and/or no tension. The signal indicative of a state of the securing member includes a signal indicative of low and/or no tension in the securing member. The lower housing includes diametrically opposed slots configured to receive the securing member, and the spring-loaded piston is configured in the inactive state when the securing member is received in the diametrically opposed slots and has tension above the threshold, thereby compressing the spring-loaded piston.

In accordance with some additional aspects of the non-limiting embodiments presently disclosed, the circuitry of the device further includes a memory having a tension module which provides computer-executable instructions configured to generate the signal indicative of a state of the securing member, including a signal indicative of low and/or no tension in the securing member. In accordance with some other aspects of the non-limiting embodiments described herein, the memory can further include a tamper module which provides computer-executable instructions configured to generate a signal indicative of tampering with the device. A processor is included in the circuitry of the device that is configured to execute the instructions of the tension module and the tamper module.

In another non-limiting embodiment of the present disclosure, a method of monitoring a securing member is described. The method includes providing a device for monitoring the securing member, the device comprising a housing and a sensor and circuitry disposed in the housing; generating a signal indicative of a state of the securing member with the sensor and circuitry; and, attaching the device to the securing member.

According to some aspects of the second non-limiting embodiment disclosed herein, the device includes a normally open switch held in a closed state when the securing member has tension above a threshold, and the signal indicative of a state of the securing member includes a signal indicative of low/no tension in the securing member.

In accordance with other aspects of the second non-limiting embodiment, the method further includes generating a signal indicative of the state of the device with the sensor and circuitry, wherein the device includes a normally open switch held in an open state when the device is in an unarmed position and held in a closed state when the device is in an armed position, and the signal indicative of a state of the device includes a signal indicative of the device being in the unarmed or armed position.

According to further aspects of the presently disclosed second non-limiting embodiment, the attaching of the device to the securing member further includes at least one of (a) providing the housing of the device with a cam latch and moving the cam latch to a latched position to attach the device to the securing member and (b) providing the housing of the device with a lower and upper housing and screwing together the upper and lower housing to attach the device to the securing member.

In accordance with still further aspects of the presently disclosed second non-limiting embodiment, the method further includes controlling the device and monitoring the generated signal indicative of the state of the securing member with an app.

In a third non-limiting embodiment of the present disclosure, a device for monitoring a securing member is described. The device includes a housing that has at least one of: (a) a lower and an upper housing configured to attach the device to the securing member and (b) a cam latch configured to attach the device to the securing member. A sensor and circuitry are disposed in the housing and are configured to generate a signal indicative of a state of the securing member and a signal indicative of a state of the device. The sensor includes a first normally open switch held in a closed state when the securing member has tension above a threshold, and the signal indicative of the state of the securing member includes a signal indicative of low and/or no tension in the securing member. The sensor also includes a second normally open switch held in a closed state when the device is in an armed position and an open state when the device is in an unarmed positioned, the signal indicative of the state of the device includes a signal indicative of the device being in the unarmed or armed position.

In one non-limiting object of the invention, there is provided a device for monitoring a securing member.

In another and/or alternative non-limiting object of the invention, there is provided a device comprising a housing, wherein the housing is configured to at least partially engage the securing member (e.g., a belt, a chain, a rope, a cord, a strap, a tether, etc.); and, a sensor and circuitry disposed in the housing and being configured to generate a signal indicative of a tension state of the securing member.

In another and/or alternative non-limiting object of the invention, there is provided a device that further comprised a cam latch; a compression member coupled to the cam latch; and, a biasing member.

In another and/or alternative non-limiting object of the invention, there is provided a device wherein the sensor includes a normally open switch held in a closed state when the securing member has tension above a threshold, and the signal indicative of a state of the securing member includes a signal indicative of low and/or no tension in the securing member.

In another and/or alternative non-limiting object of the invention, there is provided a device wherein the sensor and circuitry are configured to generate a signal indicative of a state of the device, and the sensor includes a normally open switch held in an open state when the device is in an unarmed positioned and held in a closed state when the device is in an armed position, and the signal indicative of a state of the device includes a signal indicative of the device being in the unarmed or armed position.

In another and/or alternative non-limiting object of the invention, there is provided a device wherein the housing includes a slot for receiving the securing member.

In another and/or alternative non-limiting object of the invention, there is provided a device wherein a switch is configured in the closed state when the securing member is received in the slot and the cam latch is moved to a latched position.

In another and/or alternative non-limiting object of the invention, there is provided a device wherein the cam latch and compression member are configured to move the biasing member between the armed position and the disarmed position, the biasing member being compressed against the securing member when the cam latch is in the armed position.

In another and/or alternative non-limiting object of the invention, there is provided a device wherein the housing further comprises a lower housing including a cylindrical threaded flange; an upper housing including a threaded portion configured to engage the cylindrical threaded flange of the lower housing; and, a tether joining the upper and lower housing.

In another and/or alternative non-limiting object of the invention, there is provided a device wherein the sensor includes a spring-loaded piston supported in the upper housing and held in an inactive state when the securing member has tension above a threshold and an active state when the securing member has low and/or no tension, and the signal indicative of a state of the securing member includes a signal indicative of low and/or no tension in the securing member.

In another and/or alternative non-limiting object of the invention, there is provided a device wherein the lower housing includes diametrically opposed slots configured to receive the securing member.

In another and/or alternative non-limiting object of the invention, there is provided a device wherein the spring-loaded piston is configured in the inactive state when the securing member is received in the diametrically opposed slots and has tension above the threshold thereby compressing the spring-loaded piston.

In another and/or alternative non-limiting object of the invention, there is provided a device wherein the circuitry further comprises a memory, the memory comprising a tension module providing computer-executable instructions configured to generate the signal indicative of a state of the securing member, including a signal indicative of low and/or no tension in the securing member.

In another and/or alternative non-limiting object of the invention, there is provided a device wherein the memory further comprises a tamper module providing computer-executable instructions configured to generate a signal indicative of tampering with the device.

In another and/or alternative non-limiting object of the invention, there is provided a device further comprising a processor configured to execute the instructions of the tension module and the tamper module.

In another and/or alternative non-limiting object of the invention, there is provided a method of monitoring a securing member comprising a) providing a device for monitoring the securing member, the device comprising a housing and a sensor and circuitry disposed in the housing and being configured to generate a signal indicative of a tension state of the securing member, said housing configured to at least partially engage said securing member, said securing member includes a belt, a chain, a rope, a cord, or a strap; b) generating a signal indicative of a state of the securing member with the sensor and circuitry; and, c) attaching the device to the securing member.

In another and/or alternative non-limiting object of the invention, there is provided a device includes a normally open switch held in a closed state when the securing member has tension above a threshold, and the signal indicative of a state of the securing member includes a signal indicative of low/no tension in the securing member.

In another and/or alternative non-limiting object of the invention, there is provided a device further comprising generating a signal indicative of the state of the device with the sensor and circuitry, wherein the device includes a normally open switch held in an open state when the device is in an unarmed position and held in a closed state when the device is in an armed position, and the signal indicative of a state of the device includes a signal indicative of the device being in the unarmed or armed position.

In another and/or alternative non-limiting object of the invention, wherein the attaching of the device to the securing member further comprises at least one of (a) providing the housing of the device with a cam latch and moving the cam latch to a latched position to attach the device to the securing member and (b) providing the housing of the device with a lower and upper housing and screwing together the upper and lower housing to attach the device to the securing member.

In another and/or alternative non-limiting object of the invention, there is provided a method of controlling the device and monitoring the generated signal indicative of the state of the securing member with an app.

In another and/or alternative non-limiting object of the invention, there is provided a device for monitoring a securing member comprising: a) a housing comprising at least one of: (a) a lower and an upper housing configured to attach the device to the securing member and (b) a cam latch configured to attach the device to the securing member, said securing member includes a belt, a chain, a rope, a cord, or a strap; and, b) a sensor and circuitry disposed in the housing and being configured to generate a signal indicative of a state of the securing member and a signal indicative of a state of the device, wherein the sensor includes a first normally open switch held in a closed state when the securing member has tension above a threshold, and the signal indicative of the state of the securing member includes a signal indicative of low and/or no tension in the securing member, and wherein the sensor includes a second normally open switch held in a closed state when the device is in an armed position and an open state when the device is in an unarmed position, the signal indicative of the state of the device includes a signal indicative of the device being in the unarmed or armed position.

In another and/or alternative non-limiting object of the invention, there is provided an arrangement for monitoring a tension of a securing member includes a sensor device that includes a housing, a sensor and circuitry, said housing comprising at least one of: (a) a lower and an upper housing configured to removably attach the sensor device to a portion of the securing member, and (b) a cam latch configured to removably attach the sensor device to a portion of the securing member, said securing member includes a belt, a chain, a rope, a cord, or a strap, said sensor and said circuitry at least partially disposed in the housing, said sensor and said circuitry configured to generate a signal indicative of a tension state of the securing member, said sensor includes a first normally open switch held in a closed state when the securing member has tension above a threshold tension, said signal indicative of said tension state includes a signal indicative of a tension on the securing member that is below said threshold tension.

In another and/or alternative non-limiting object of the invention, there is provided a method for monitoring a tension of a securing member comprising: a) providing a sensor device, said sensor device includes a housing, a sensor and circuitry, said housing comprising at least one of: (a) a lower and an upper housing configured to removably attach the sensor device to a portion of the securing member, and (b) a cam latch configured to removably attach the sensor device to a portion of the securing member, said securing member includes a belt, a chain, a rope, a cord, or a strap, said sensor and said circuitry at least partially disposed in the housing, said sensor and said circuitry configured to generate a signal indicative of a tension state of the securing member, said sensor includes a first normally open switch held in a closed state when the securing member has tension above a threshold tension, said signal indicative of said tension state includes a signal indicative of a tension on the securing member that is below said threshold tension; b) connecting said sensor device to said securing member; c) activating said sensor device; and, d) remotely monitoring a status of said sensor device by a wireless device, said sensor device configured to wirelessly transmit said signal to said wireless device when said tension on the securing member that is below said threshold tension.

In another and/or alternative non-limiting object of the invention, there is provided a device wherein the sensor device includes a second normally open switch held in held in a closed state when the device is in an armed position and an open state when the device is in an unarmed positioned, the signal indicative of the state of the device includes a signal indicative of the device being in the unarmed or armed position.

These and other objects and advantages will become apparent from the discussion of the distinction between the disclosure and the prior art and when considering the preferred embodiment shown in the accompanying drawings.

BRIEF DESCRIPTION OF THE DRAWINGS

FIG. 19A is an image of the app configured to send and receive data to and from the exemplary strap alarm devices and illustrates an exemplary "Home" page of the app in accordance with the present disclosure;

FIG. 19B illustrates another exemplary "Home" page of the app in accordance with the present disclosure;

DETAILED DESCRIPTION

Figure 1:
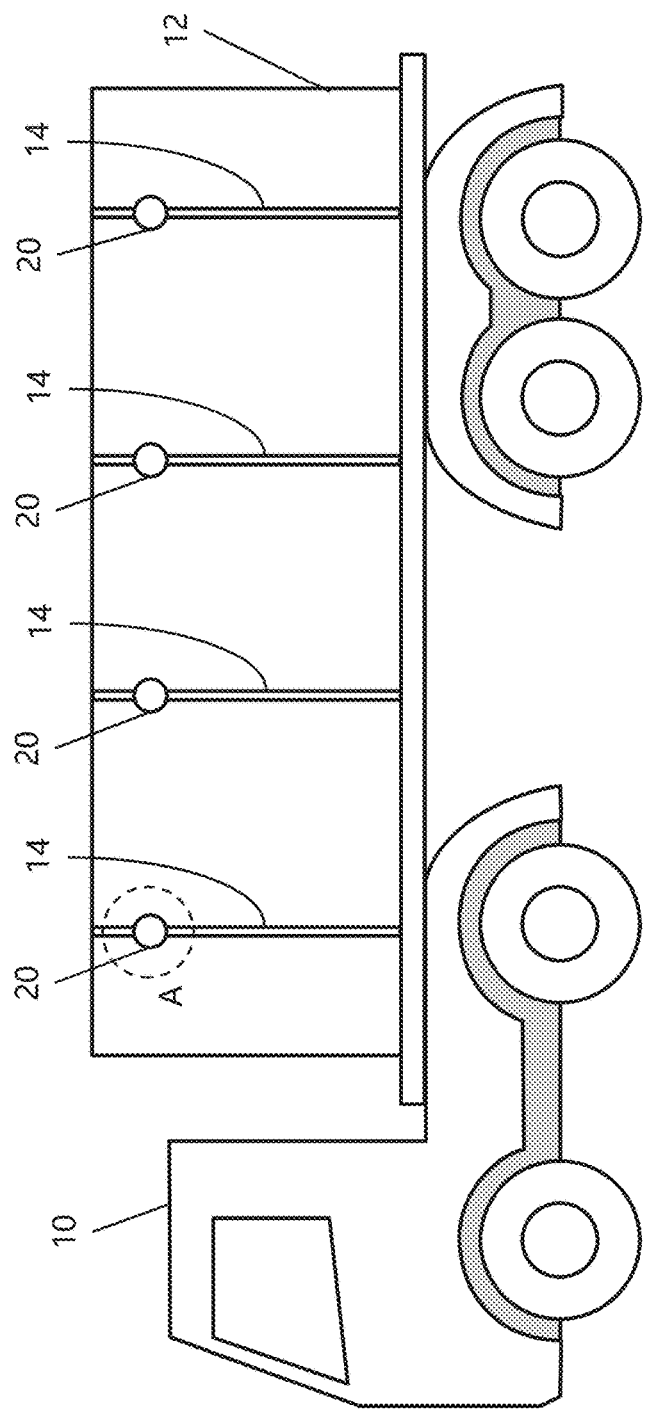
FIG. 1 is a side elevational view of a transport vehicle hauling a load of cargo secured with straps, each strap having a strap alarm device secured thereto in accordance with the present disclosure.

With reference to FIG. 1, an exemplary transport vehicle 10 is shown hauling a load 12 on a bed portion thereof. The load 12 is secured to the transport vehicle via several securing members in the form of straps 14 that are secured to opposite sides of a bed portion of the transport vehicle 10 and extend around the load 12. Each strap 14 is tensioned against the load 12 by a tensioning mechanism (not shown) for example, or by hand. The transport vehicle 10 is exemplary in nature, and aspects of the present disclosure can be used with virtually any type of securing member regardless of whether the securing member is used to secure a load to a transport vehicle.

Figure 2:
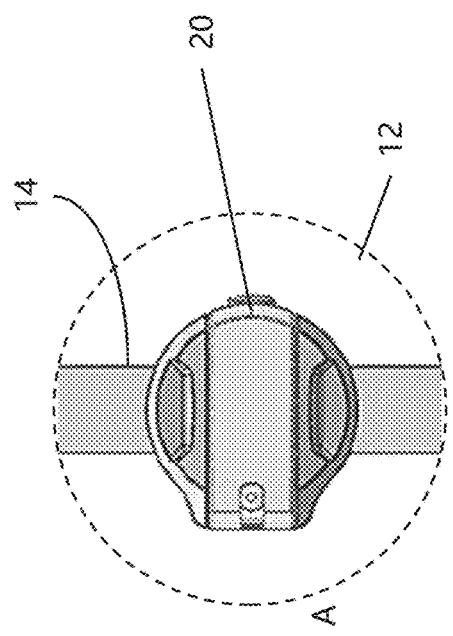
FIG. 2 is an enlarged portion of FIG. 1.

As shown in FIG. 1, and as best seen in FIG. 2, an exemplary strap alarm device 20 in accordance with the present disclosure is secured to each strap 14. As will be described in detail below, each exemplary strap alarm device 20 is a wireless (or optionally wired), self-contained unit configured to detect and generate an alert or notification in the event that strap 14 tension drops below a threshold level, and/or detect and generate an alert or notification in the event the strap alarm device 20 is removed from the strap 14 or tampering with the strap alarm device is otherwise detected. The tension threshold level can be preset and/or be manually set.

Figure 3:
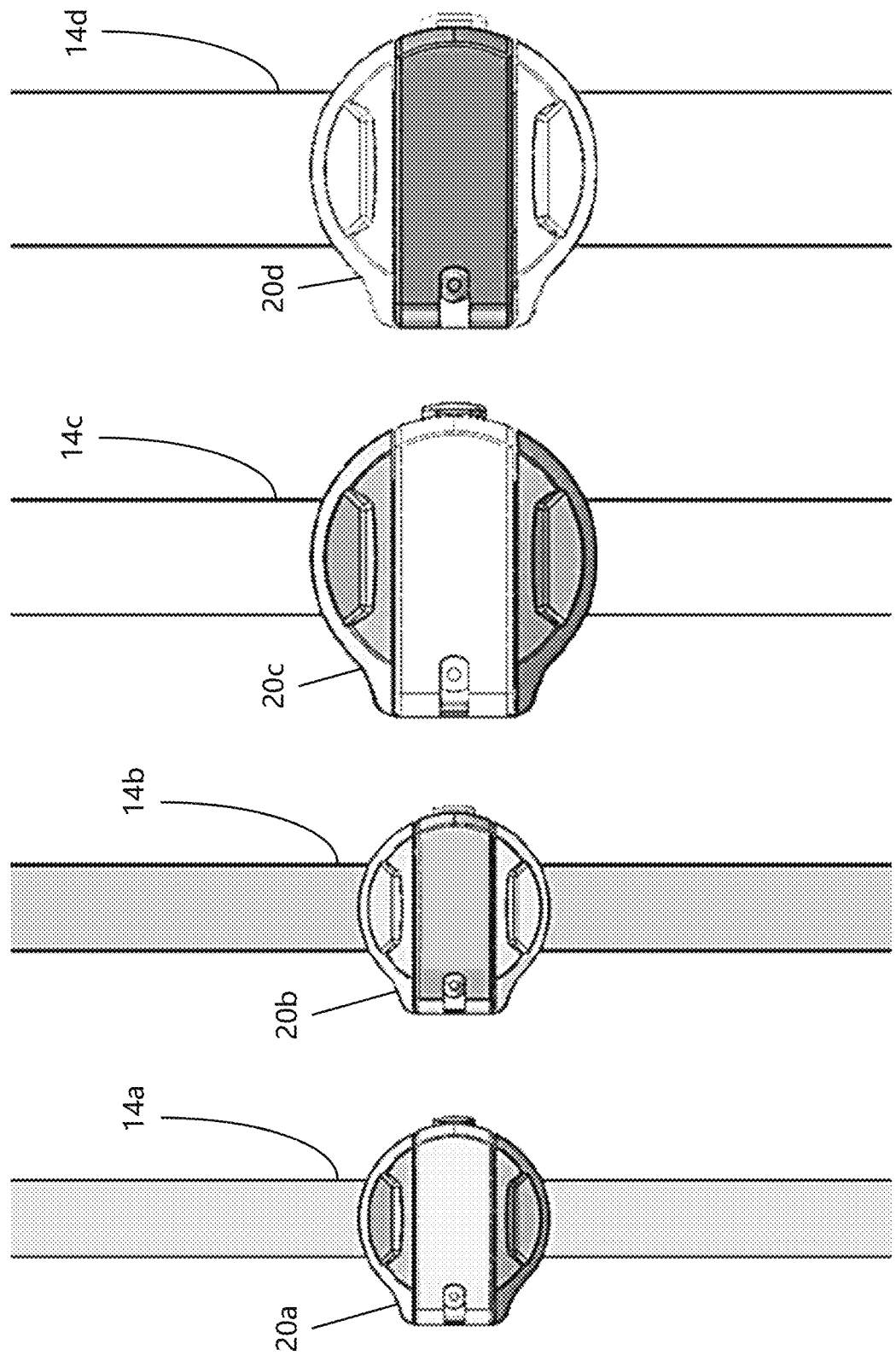
FIG. 3 illustrates several different size strap alarm devices in accordance with the present disclosure for use with straps of different sizes and/or capacities.

As shown in FIG. 3, it should be appreciated that strap alarm devices in accordance with the present disclosure can be provided in a variety of sizes, such as strap alarm devices 20a-20d, to accommodate virtually any capacity or strap size, such as straps 14a-14d, where strap 14a is the smallest in size, strap 14d is the largest in size, and straps 14b and 14c are in between straps 14a and 14d, respectively. In some particular embodiments, the straps illustrated in FIG. 3 are rated to safely secure varying load capacities, where strap 14a has a capacity of about 1,500 lbs., strap 14b has a capacity of about 3,000 lbs., strap 14c has a capacity of about 5,000 lbs., and strap 14d has a capacity of about 10,000 lbs. The size, shape and materials used to form the strap alarm device are non-limiting. In addition, the capacity, size, shape, and materials used for the straps are non-limiting.

Figure 4:
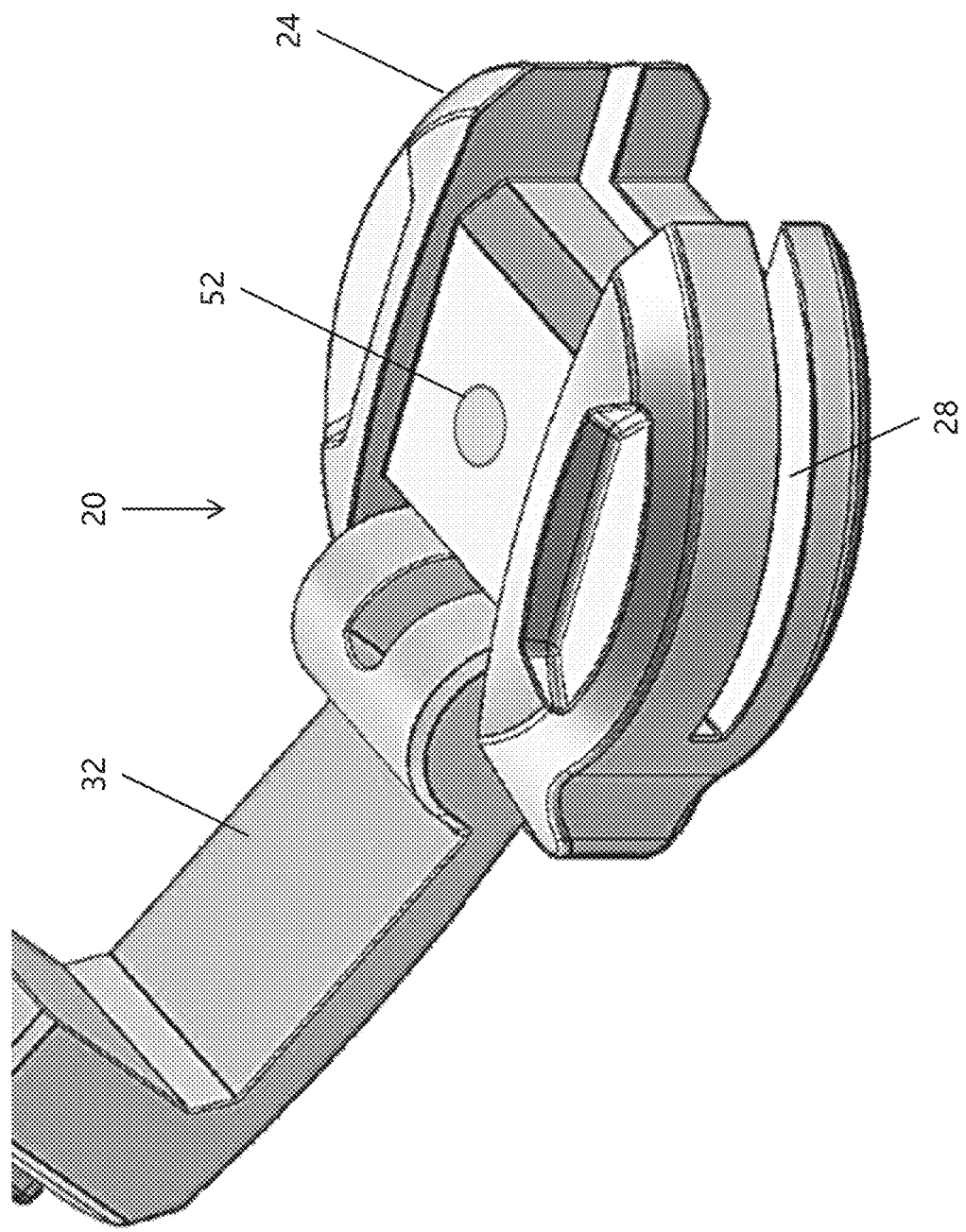
FIG. 4 is a perspective top view of an exemplary embodiment of a strap alarm device in an unlatched position.
Figure 5:
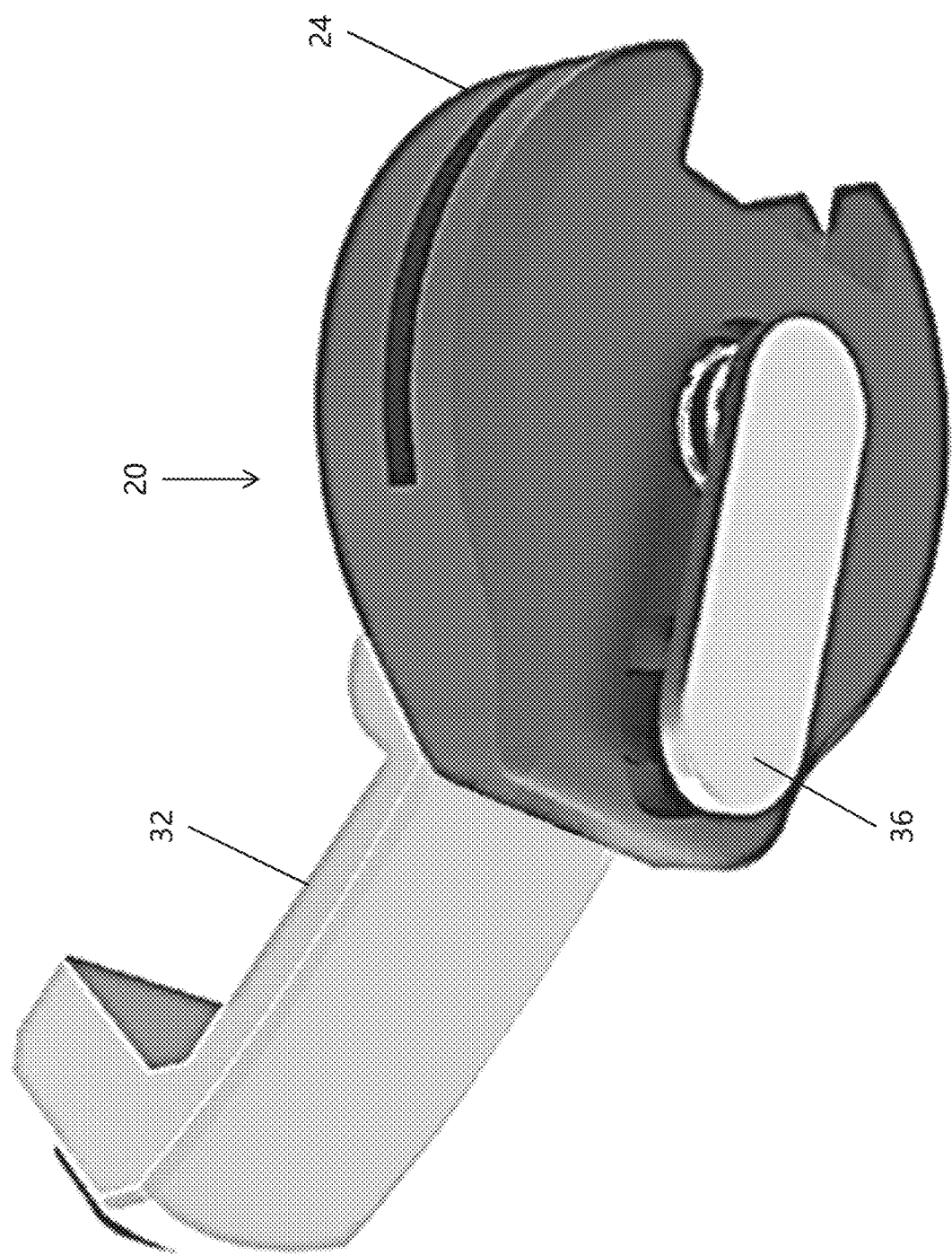
FIG. 5 is a perspective bottom view of the strap alarm device of FIG. 4.
Figure 6:
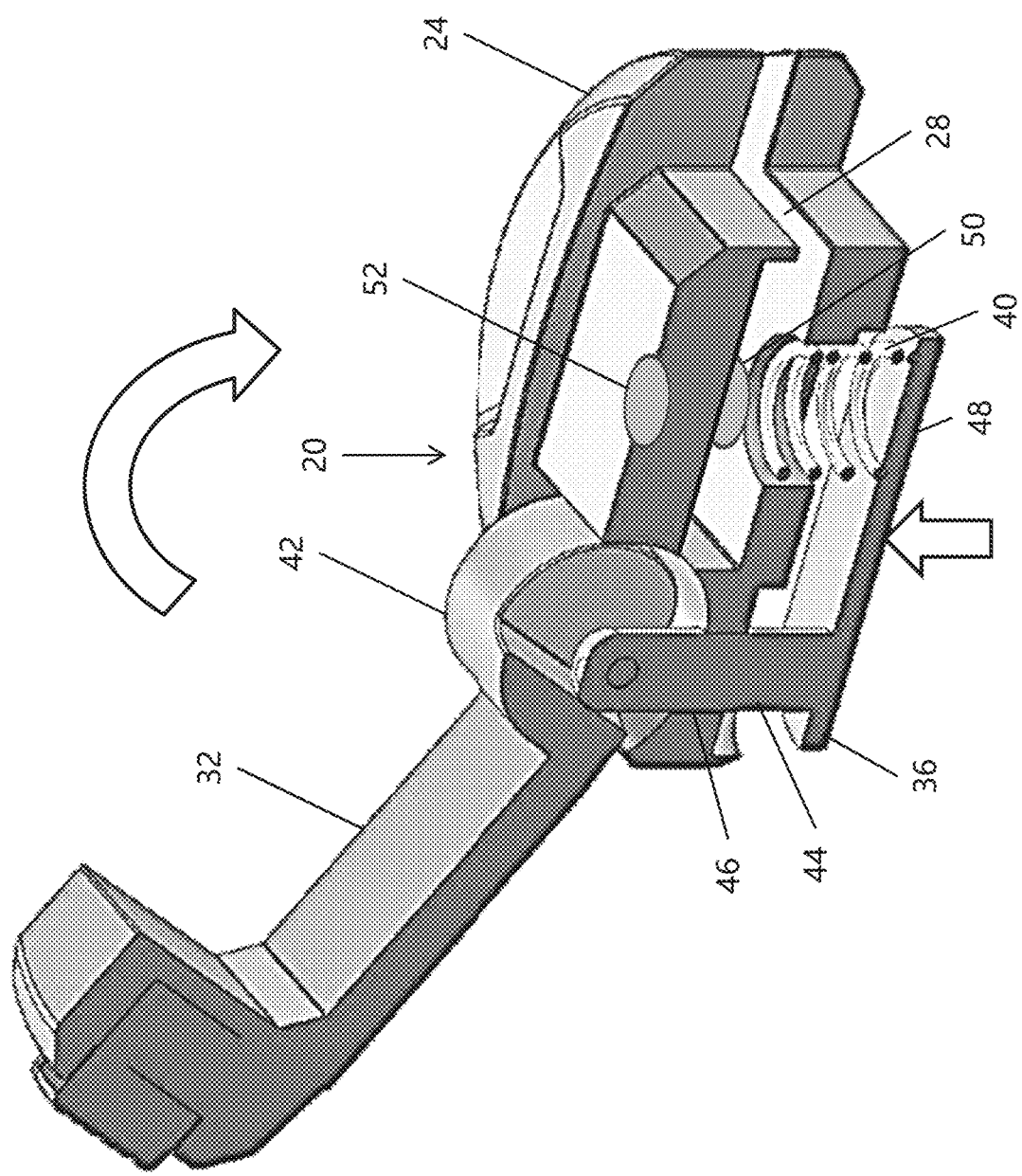
FIG. 6 is a cross-sectional view of the strap device of FIG. 4.

With reference to FIGS. 4-6, the strap alarm device 20 generally includes a housing 24 having a slot 28 for receiving a strap 14. In the exemplary embodiment, the housing 24 is quasi-cylindrical and the slot 28 extends in a plane generally perpendicular to the axial dimension of the quasi-cylindrical housing 24 (e.g., a radial slot); however, this is not required. The exemplary slot 28 extends across a major portion of a diameter of the quasi-cylindrical housing 24 and has a width configured to receive a strap of roughly similar width; however, this is not required.

The housing 24 supports a cam latch 32 coupled to a compression member 36 that is configured to move a biasing member 40 between an armed position and a disarmed position (disarmed position shown in FIG. 6). To this end, cam latch 32 includes a generally cylindrical lower portion 42 pivotally supported by the housing 24. As can be appreciated, other shapes can be used. Compression member 36 includes a rod portion 44, slidingly received in a bore 46 of the housing 24, and a compression plate portion 48. The rod portion 44 is pivotally coupled to the lower portion 42 of the cam latch 32 at an off-center position such that rotation of the cam latch 32 between an unlatched position (e.g., FIGS. 4-8) and a latched position (e.g., FIG. 9) results in reciprocating axial movement of the compression member 36 relative to the housing 24. As can be appreciated, other arrangements can be used to cause the compression member to move into and out of a locked or engaged position.

The housing 24 further supports first and second sensors in the form of switches 50 and 52. The switch 50 is configured to sense if a strap 14 is loose, while the switch 52 is configured to sense if the strap alarm device 20 is removed and/or tampered. As can be appreciated, switch 52 is optional. To this end, it will be appreciated that the normally open switch 50 is forced to a closed position when a strap 14 is received in the slot 28 and the cam latch 32 is moved to the latched position (shown in FIG. 9) thereby compressing the biasing member 40 against the strap 14 and, consequently, depressing the switch 50 to a closed position. Meanwhile, the cam latch 32 forces the normally open switch 52 to a closed position when in the latched position.

The cam latch 32 can be retained in the latched position in any suitable manner. In the illustrated embodiment, the cam latch 32 is retained in the closed position as the point of attachment of the rod portion 40 is rotated over center when the cam latch 32 is in the latched position.

Figure 7:
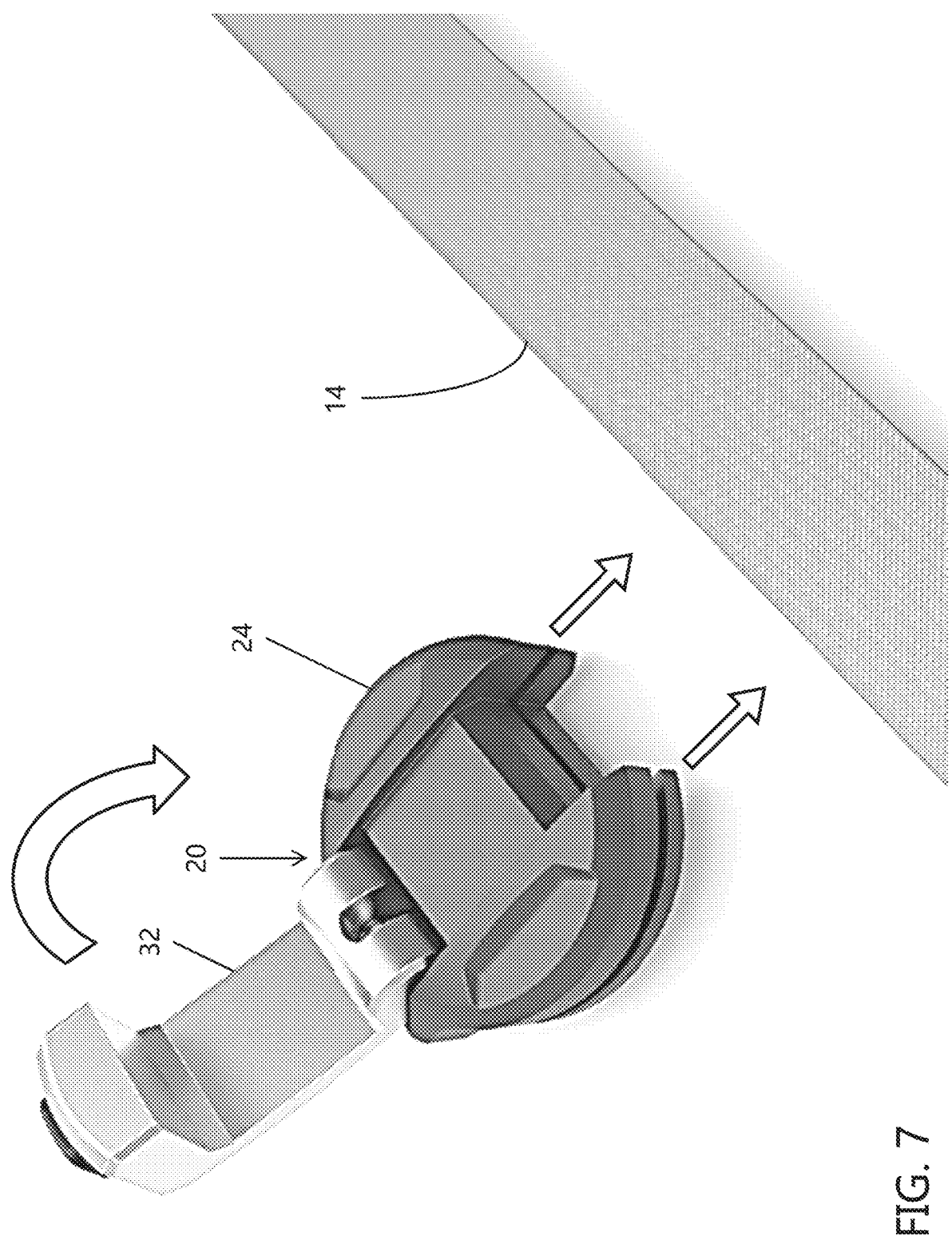
FIG. 7 is a perspective view of the strap device of FIG. 4 illustrating the manner in which the device can be installed on a strap.
Figure 8:
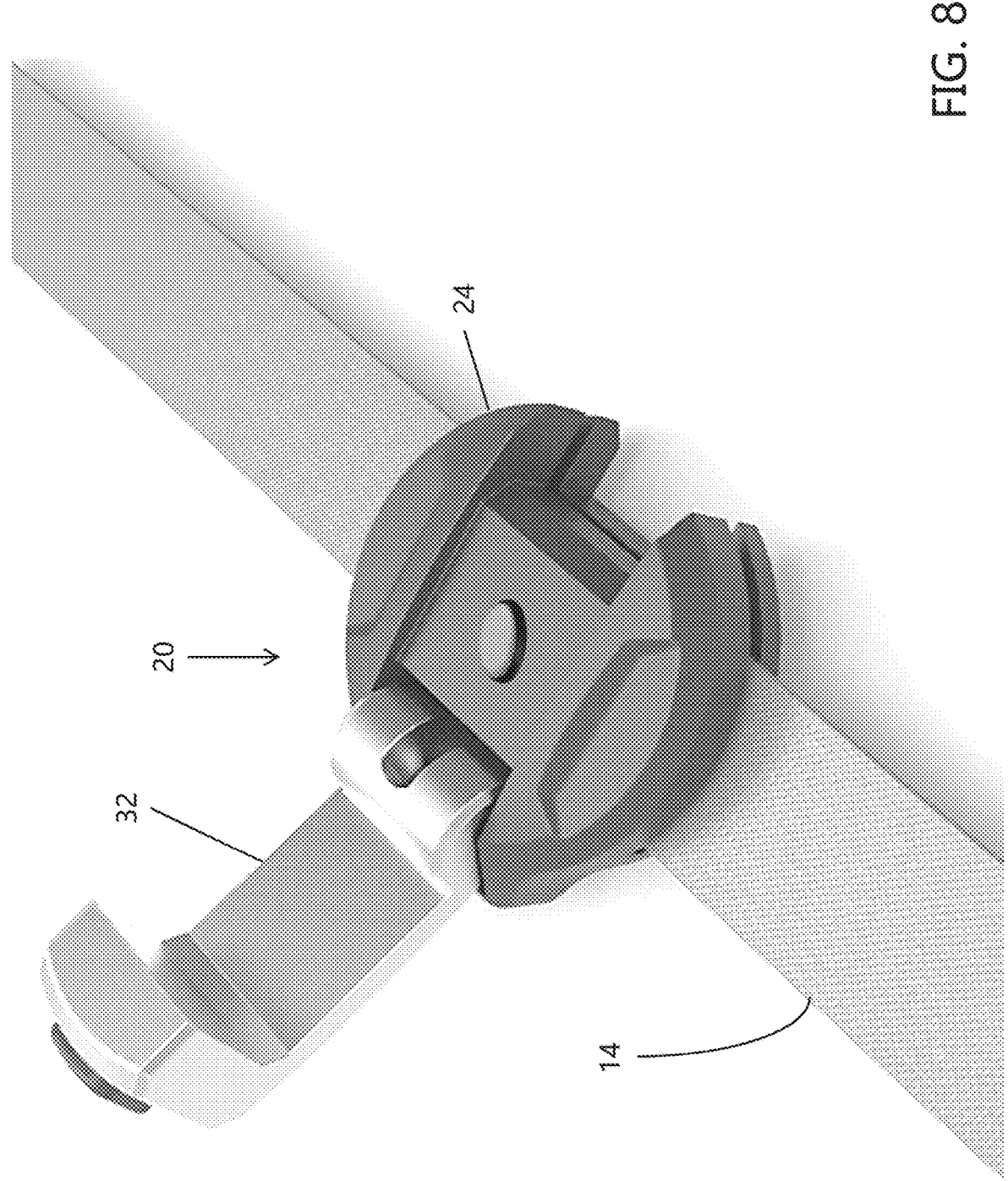
FIG. 8 is a perspective view of the strap device of FIG. 4 engaged with the strap in an unlatched state prior to securing thereto.
Figure 9:
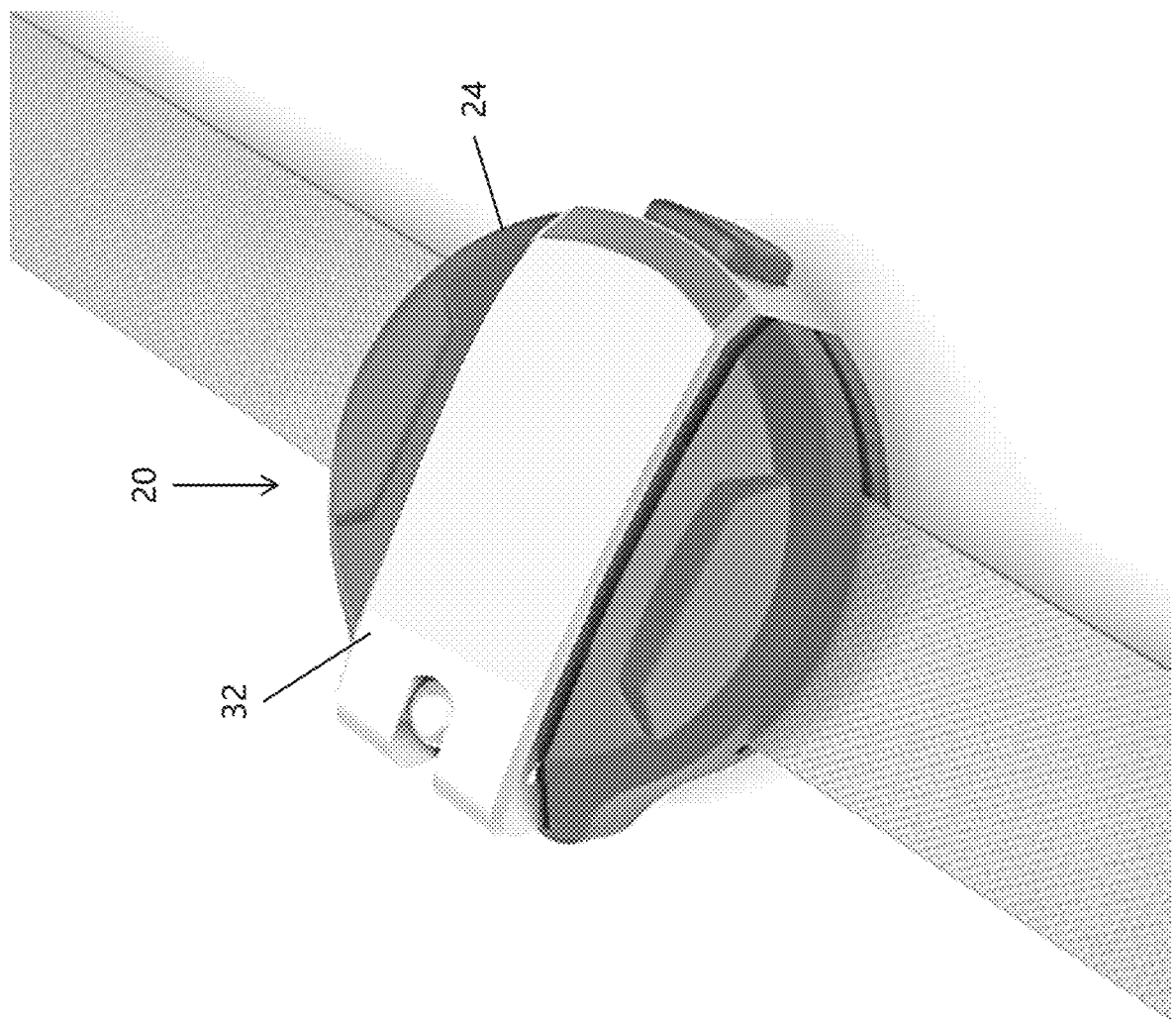
FIG. 9 is a perspective view of the strap alarm device of FIG. 4 in a latched state secured to the strap.
Figure 10:
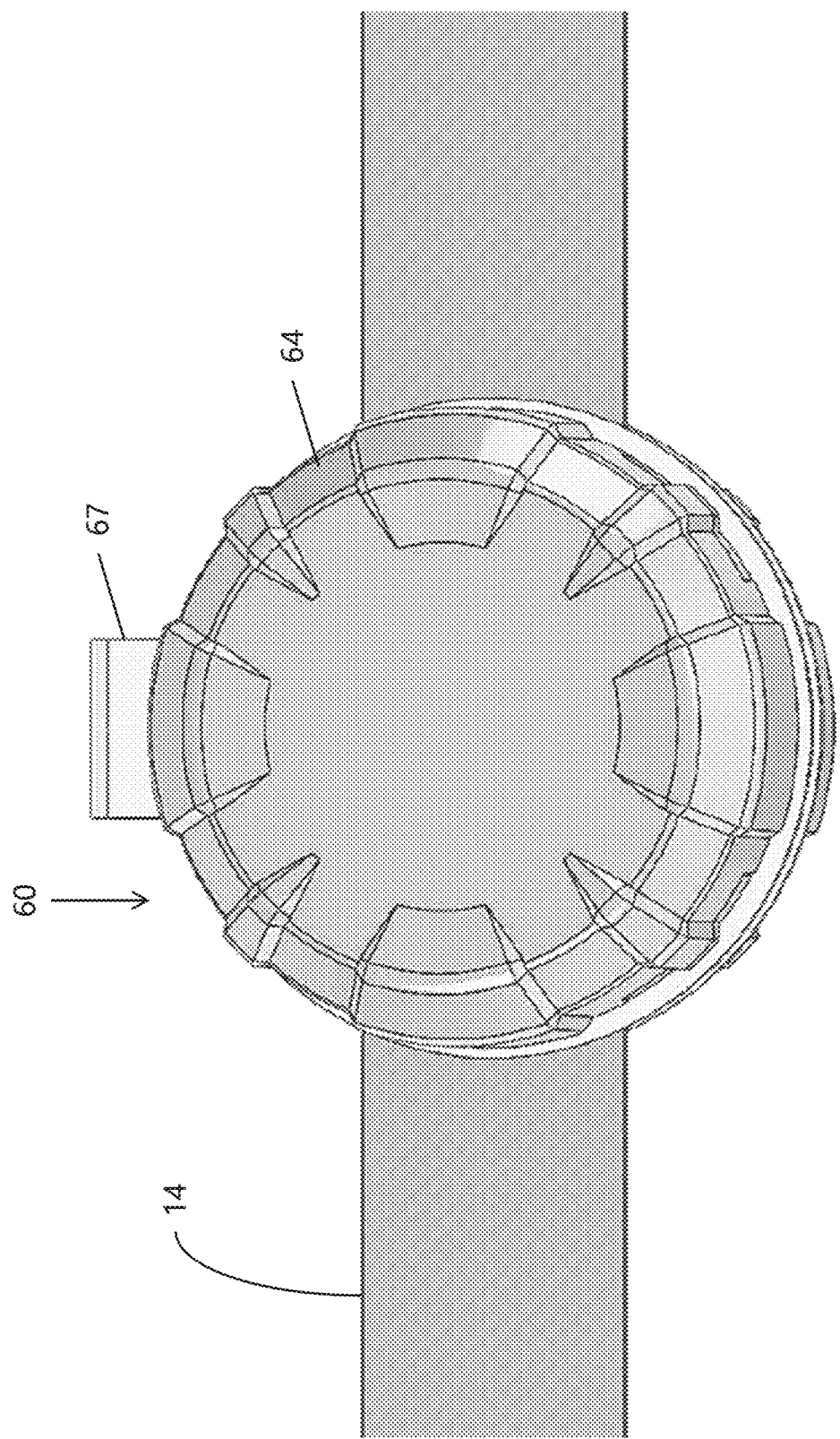
FIG. 10 is a perspective view of another exemplary strap alarm device in accordance with the present disclosure.
Figure 11:
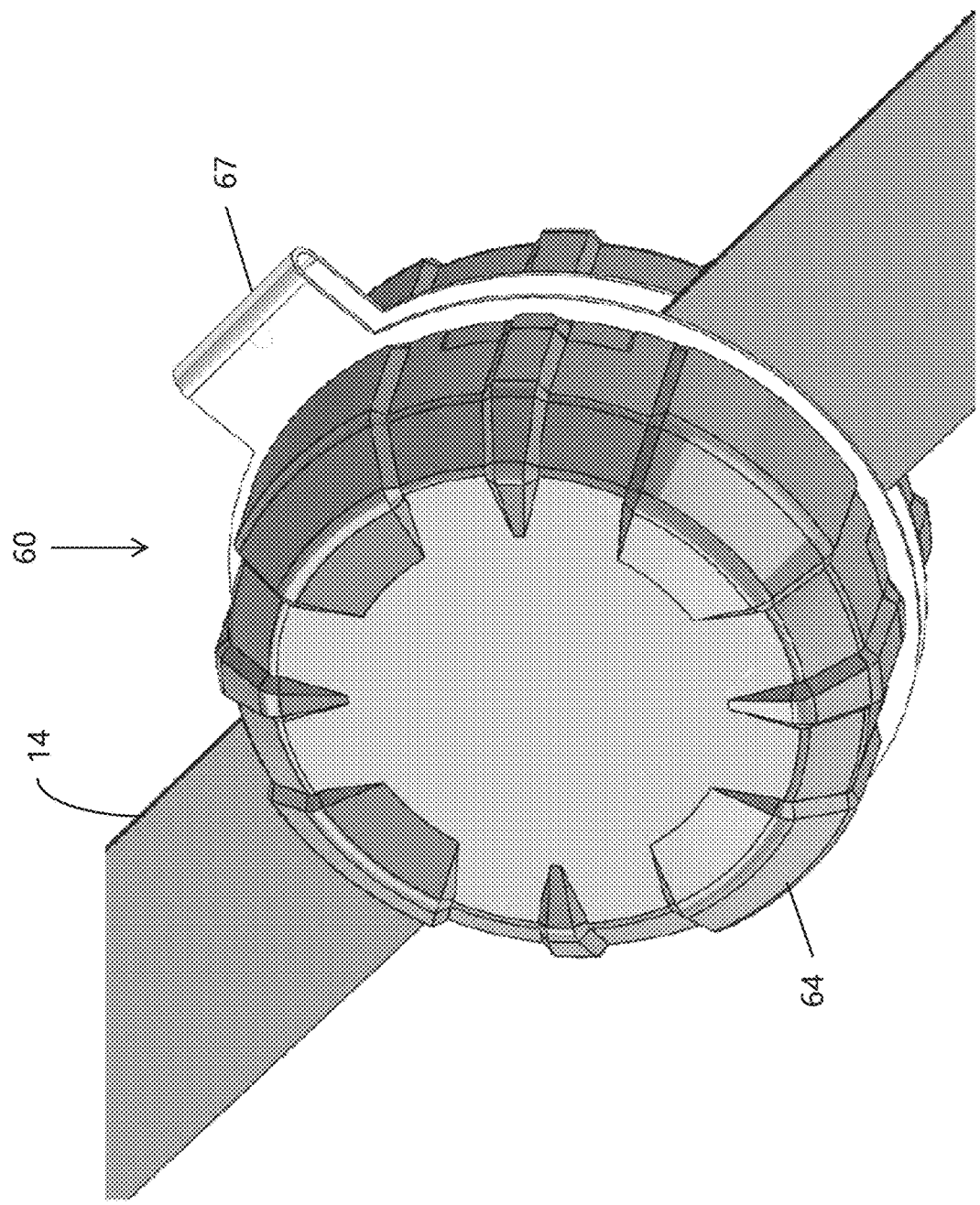
FIG. 11 is another perspective view of the strap alarm device of FIG. 10.
Figure 12:
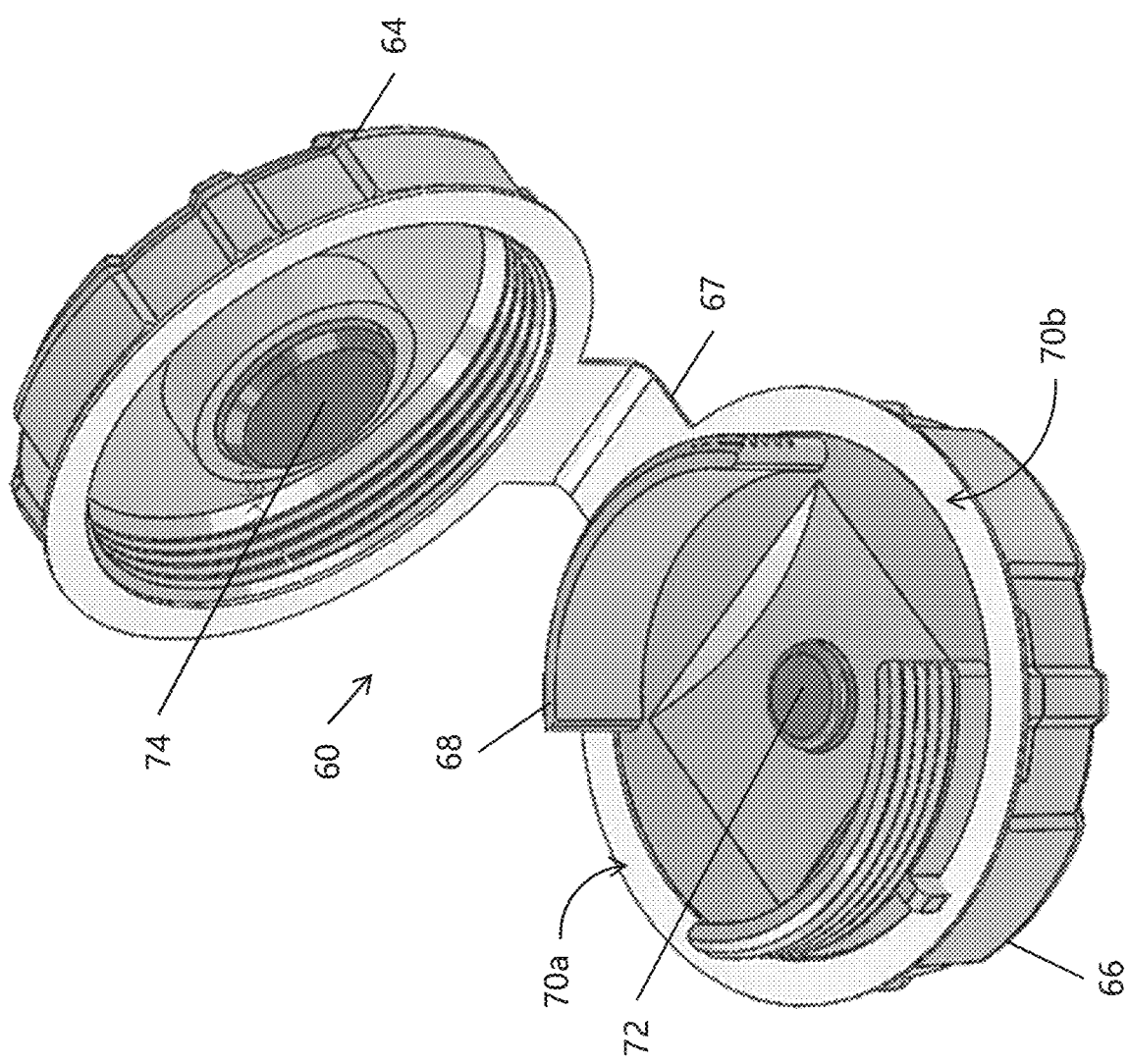
FIG. 12 is a perspective view illustrating the strap alarm device of FIG. 10 in an unsecured state.
Figure 13:
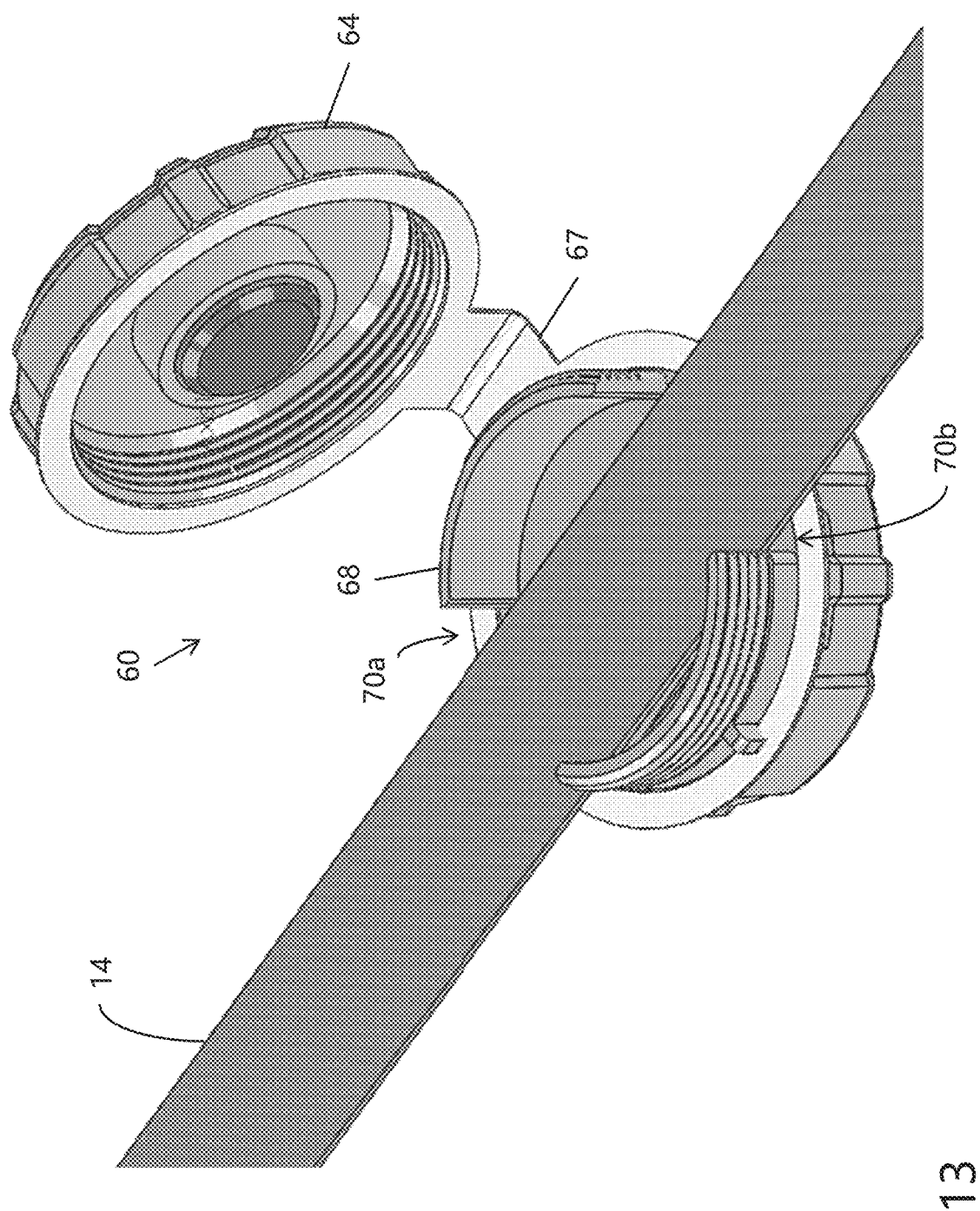
FIG. 13 is a perspective view of the strap alarm device of FIG. 12 engaged with a strap prior to securing.

FIGS. 7-9 illustrate an exemplary manner in which the strap alarm device 20 can be installed and activated on a strap 14.

It should be appreciated that any suitable switch or sensor can be employed, such as magnetic switches or the like, without departing from the scope of the present disclosure. Moreover, the configuration of the switch 50 as a normally open switch has several advantages. First, the switch 50 can be used to energize the internal circuitry of the strap alarm device 20 such that unless the device is installed on a strap 14, the internal power source is not being utilized. To this end, it should be appreciated that the biasing member 44 can optionally be configured not to activate the switch 50 even when the latch 32 is in the closed position unless a strap 14 is in the slot 28.

That is, in one embodiment, the strap alarm device 20 can only be activated when secured to a strap 14 under sufficient tension. Once the switch 50 is closed, the strap alarm device 20 can remain activated until disarmed by a remote unit, as will be described below. This can prolong battery life and simplifies installation and removal by providing, in essence, an automatic on/off feature. Unlike prior art strap tension alarm devices that require on/off switches or partial disassembly to disable the device, the strap alarm device 20 of the present invention is simple to use and can be stored in the latched (e.g., armed) position without taking extra action and without unnecessary battery drain.

In another embodiment, the switch 52 can be used to arm the strap alarm device 20. This can allow the strap alarm device 20 to be used when tensioning straps determine when proper tension is reached. For example, if the strap alarm device 20 is installed on an un-tensioned strap and armed, the strap alarm device 20 will generate a signal indicative of low or no tension on the strap until such time as the strap is tensioned sufficiently to close switch 50. In still other embodiments, the strap alarm device can include an on/off switch or can otherwise be armed/disarmed.

Turning to FIGS. 10-14 another exemplary embodiment of a strap alarm in accordance with the present disclosure is illustrated and identified generally by reference numeral 60. The strap alarm device 60 generally includes a two-part housing 62 including an upper housing 64 and a lower housing 66. The upper and lower housing 64 and 66 can be joined together by a tether 67, hinge, etc. The tether 67 (when used) can be made of an elastomeric or other material. The cylindrical portions can be formed of a material and have sufficient thickness such that when the strap alarm device 60 is installed on the strap 14, the cylindrical portions apply sufficient pressure to the strap 14 to prevent slippage of the strap alarm device 60 along the strap 14.

The upper and lower housing 64 and 66 are configured to be threaded together to trap a strap 14 therebetween; however, other arrangements can be used (e.g., snap, etc.). To this end, the lower housing 66 includes a cylindrical threaded flange 68 having diametrically opposed slots 70a and 70b through which the strap 14 is configured to extend when the strap alarm device 60 is installed on the strap 14. The upper housing 64 includes corresponding threads for engaging the threads of the lower housing such that the upper housing 64 and lower housing can be screwed together for securing about a strap.

The lower housing 26 includes an internal chamber 71 for circuitry, power supply, etc., and also supports a switch 72 that acts as a sensor to determine when the strap 14 has sufficient tension. The upper housing 24 supports a biasing member such as, but not limited to, a spring-loaded piston 74 which is configured to activate switch 72 when the upper and lower housings 64 and 66 are connected together a sufficient amount.

Figure 14:
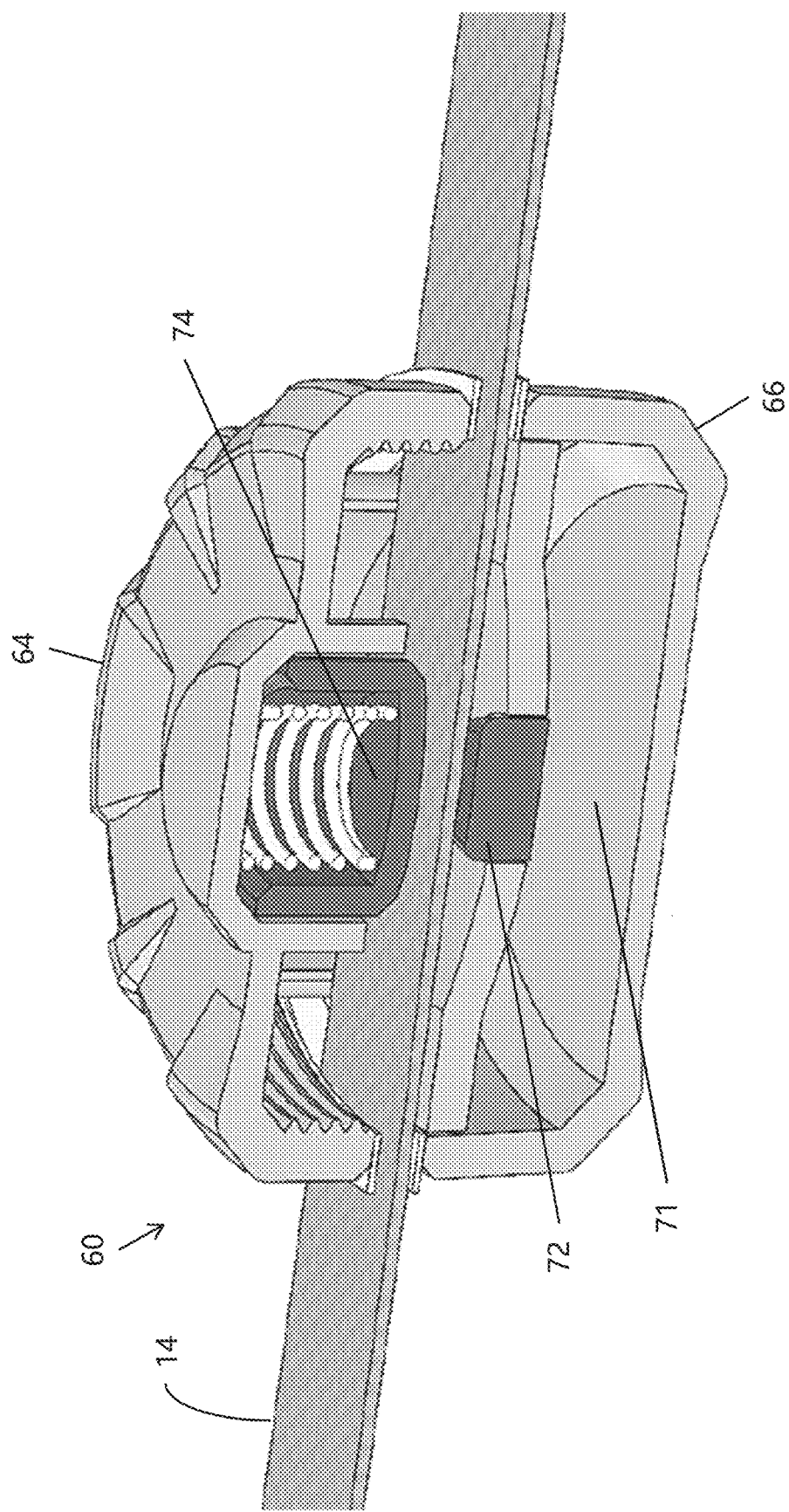
FIG. 14 is a cross-sectional view of the strap alarm device of FIG. 10 secured to the strap.

Thus, when the strap alarm device 60 is properly installed on the strap 14 as best seen in FIG. 14, tension in the strap 14 acts against the spring-loaded piston 74 to prevent it from contacting and depressing switch 72. In this position, the strap alarm device 60 does not generate a signal indicative of a loose strap. Should the strap tension decrease a sufficient amount, the spring-loaded piston 74 will act on the switch 72 and the strap alarm device 60 will generate a signal indicative of low or no strap tension.

Figure 15:
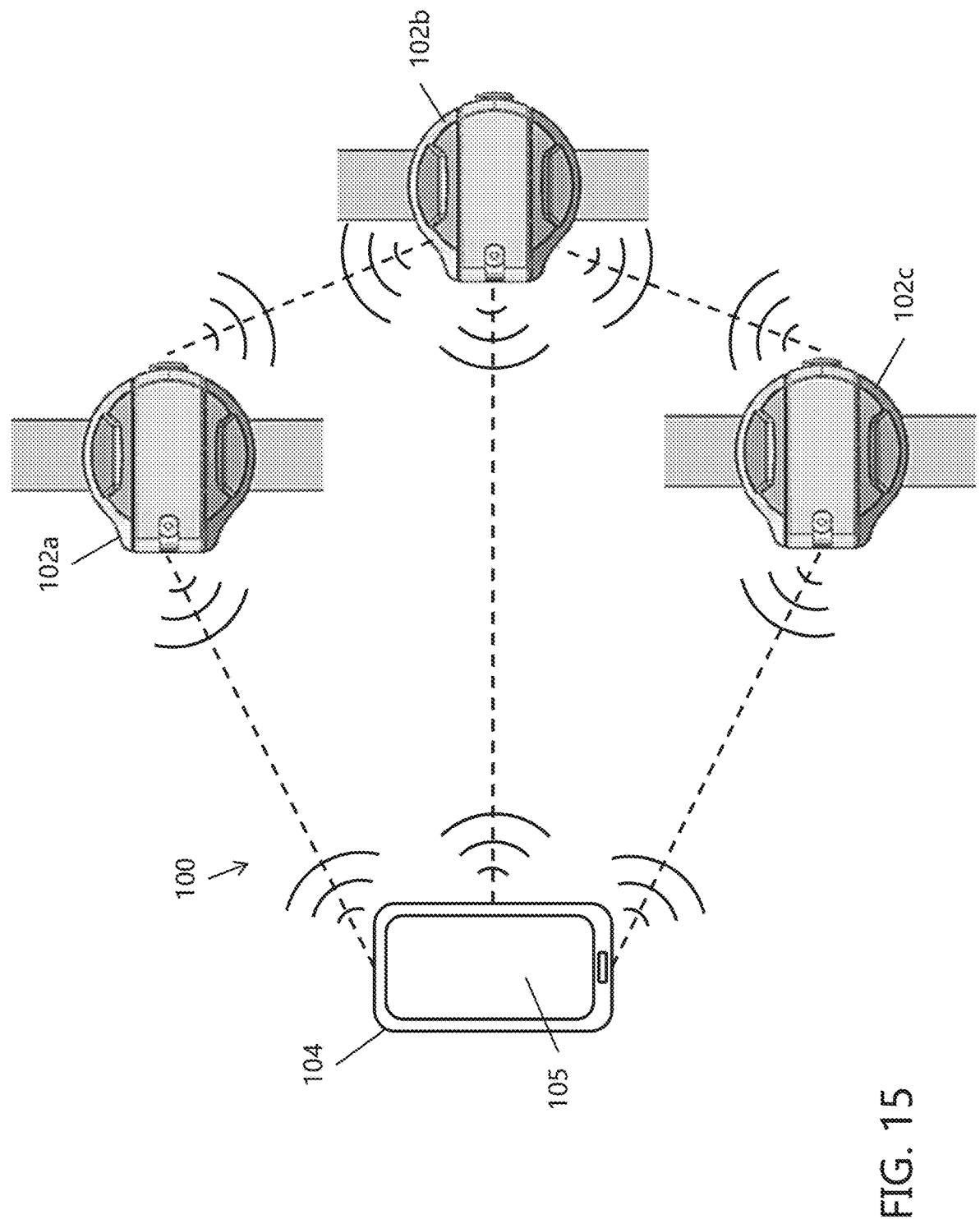
FIG. 15 is a schematic diagram of an exemplary strap alarm system in accordance with the present disclosure.

FIG. 15 illustrates an exemplary system 100 including three strap alarm devices 102a, 102b, 102c and a remote operator device in the form of a mobile phone 104 or other smart device or computer or tablet, etc. The mobile phone generally includes a screen 105 for visually relaying information to a user related to the three strap alarm devices 102a, 102b, 102c. In an embodiment, an app running or program on the mobile phone 104 or other smart device or computer or tablet, etc. is configured to send and receive data to/from the strap alarm devices 102a, 102b, 102c to provide one or more of the following functions:

arm/disarm the strap alarm devices 102a, 102b, 102c;
monitor strap tension during tensioning of straps;
monitor the degree or amount of strap tension;
monitor battery power or power level;
monitor signal strength;
reset alarm;
change tension setting for activation of alarm;
monitor alarm history;
toggle on/off an audible/visual alarm of the strap alarm devices 102a, 102b, 102c;
configure operating parameters of the strap alarm devices 102a, 102b, 102c; and/or
forward credentials to a third party to gain access to the strap alarm devices 102a, 102b, 102c.

It should be appreciated that any wireless communication protocol can be employed. In one embodiment, the strap alarm devices 102a, 102b, 102c communicate with the mobile phone 104 using Bluetooth. In other cases, the strap alarm devices 102a, 102b, 102c can be configured with other wireless protocols that can provide mesh network functionality such that a strap alarm device out of range of the mobile phone 104 can still communicate with the mobile phone 104 via intermediate strap alarm devices that are in communication with the mobile phone 104 or other smart device or computer or tablet, etc.

In one embodiment, the strap alarm system 100 is configured to operate such that when the mobile device 100 is in range of the strap alarm devices 102a, 102b, 102c, the strap alarm devices 102a, 102b, 102c operate to inform a user of the mobile phone 104 or other smart device or computer or tablet, etc. whether the straps are loose, whether a monitoring malfunction may have occurred, whether possible tampering has occurred, and can also be used during tightening of the straps to determine when proper tension is achieved. Upon termination of a link between the mobile phone 104 or other smart device or computer or tablet, etc. and one or more of the strap alarm devices 102a, 102b, 102c, the strap alarm devices 102a, 102b, 102c can optionally be configured to activate an alarm mode for as long as the mobile phone 104 is out of range. In the alarm mode, an audible and/or visual alarm is activated when either the strap tension drops below a threshold or one or more strap alarm devices is tampered with or otherwise battered. The alarm mode can be automatically activated unless a user deactivates the alarm mode prior to termination of the communication link.

Referring now to FIGS. 16-26D, additional non-limiting details of an app configured to send and receive data to/from the strap alarm devices of the present disclosure are shown. More particularly, FIGS. 16-26D illustrate various pages of an app which could be shown on a screen of a device (such as screen 105 of mobile device 104 in FIG. 15) when a user is operating the app and exemplary strap alarm devices.

Figure 16:
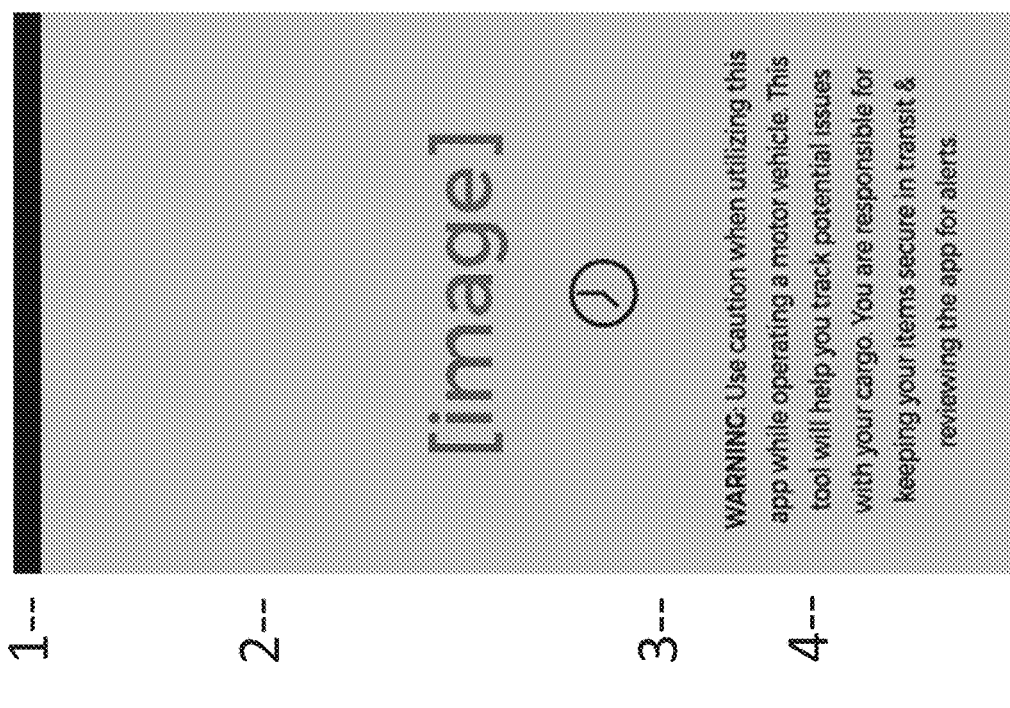
FIG. 16 is an image of an app configured to send and receive data to and from the exemplary strap alarm devices in accordance with the present disclosure and illustrates an exemplary "Welcome Screen" page of the app.

FIG. 16 illustrates a non-limiting exemplary "App Welcome Screen" that may appear the first time the app is opened. More particularly, the app page illustrated in FIG. 16 may appear on device screen 105 temporarily once the app is opened and remain on the screen until the app loads. The "App Welcome Screen" of FIG. 16 can include information such as: (1) a notification bar (which is generally visible in all views of the app); (2) a welcome image, which may include graphics or company logos; (3) loading icon (e.g., a throbber); and (4) a warning message such as warnings about utilizing the app while driving, including that the user is still responsible for their cargo, that the user is responsible for watching & addressing alerts that appear, etc. Generally no user actions can be taken during the exemplary "App Welcome Screen" illustrated in FIG. 16.

Figure 17:
FIG. 17 is an image of the app configured to send and receive data to and from the exemplary strap alarm devices and illustrates an exemplary "General Layout" of the app in accordance with the present disclosure.

FIG. 17 illustrates a non-limiting exemplary "App General Layout" page that may appear on the screen 105. The information shown on screen 105 and illustrated in FIG. 17 may include, for example: (1) a company logo; (2) a main content area where details shown will depend on which icon is selected from the lower tab bar; and (3) a tab bar which includes one or more customizable icons that can each indicate the different pages/locations of the app where a user can navigate or where a user might be located in the app at a given time. The actions a user can take on the "General Layout" screen of FIG. 17 include clicking each icon in the tab bar (3), which will take the user to another screen view including additional details specific to the clicked icon.

Figure 18:
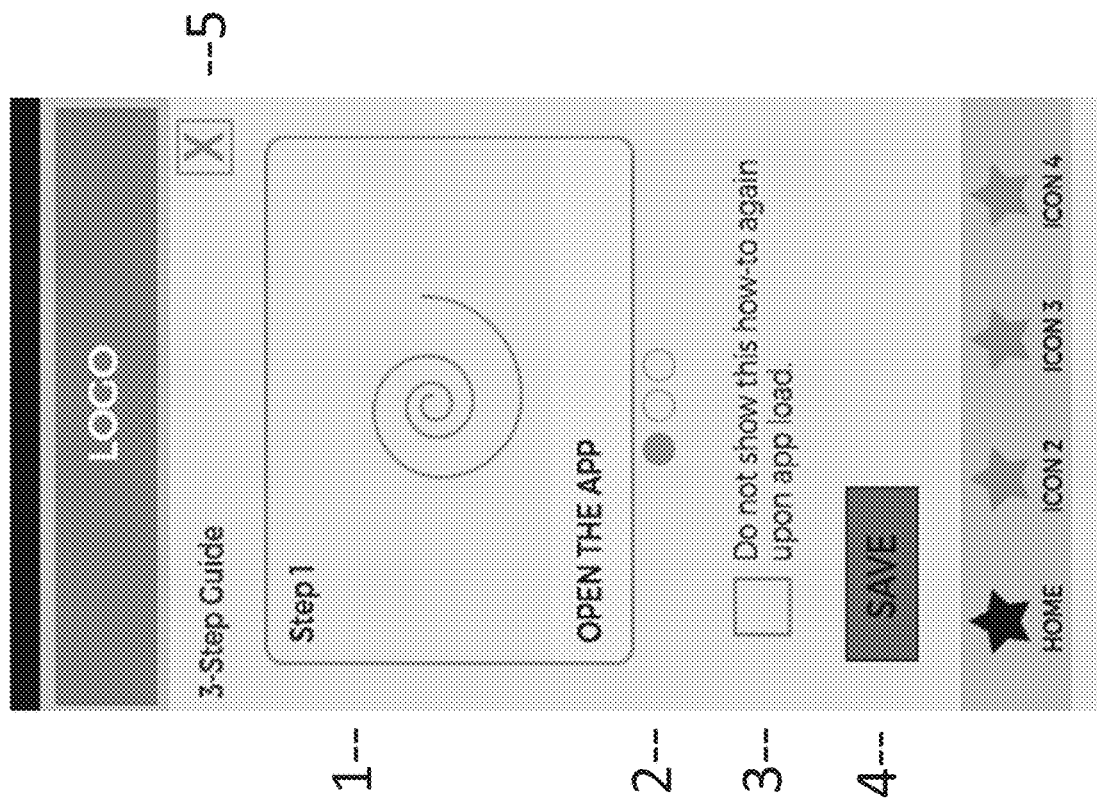
FIG. 18 is an image of the app configured to send and receive data to and from the exemplary strap alarm devices and illustrates an exemplary "Pop-Up How-To" page of the app in accordance with the present disclosure.

FIG. 18 illustrates a non-limiting exemplary "Pop-Up How-To" page that may appear on the screen 105 when the app is in use. This "Pop-Up How-To" page will pop-up each time the app is opened, until the user selects to no longer show the app. The "Pop-Up How-To" page may show information including, for example: (1) imagery such as a text description for each step; (2) radio buttons which indicate that a "swipe" action can be used to see each step; (3) an option to stop showing the "Pop-Up How-To" page; (4) a "save" option if the "do not show" box is selected that must be clicked for these settings to change, and after clicking save, the user returns to the home screen; and (5) the option to "click X" and close the window without saving.

FIGS. 19A and 19B illustrate a non-limiting exemplary initial view that may appear on the screen 105 when the app is opened. In FIG. 19A, an exemplary page is illustrated which shows the app prior to any sensors having been synced. The information on the exemplary page illustrated in FIG. 19A may include: (1) a "+ Add Sensor" option which the user can click to open a Bluetooth window of sensors that may be recognized (see FIG. 19B). In some particular embodiments, the "+ Add Sensor" screen may not be needed if the sensors are configured to be automatically recognized; (2) an "Activate All" option that is only available after the strap alarm sensor(s) of the present disclosure have been added and appear below the "recognized sensors" text at the top of the screen 105; and (3) an active icon which changes color to indicate a user's current location in the app.

In FIG. 19B, an exemplary page on screen 105 is illustrated which shows a pop-up window that searches and shows all recognized Bluetooth strap alarm devices. If more than one strap alarm device is shown, check boxes can appear to provide the user with the option to select multiple devices for paring. More particularly, the Bluetooth pop-up window illustrated in FIG. 19B can show information such as: (1) sensors found, where a user can perform the action of checking one or more boxes to identify a device which the user would like to pair with the app; (2) a loading icon (e.g., a throbber icon) which identifies that the app is still searching for sensors, and if no sensors appear, a "help" link (not shown) can be offered to the user which provides a document explaining how to find local sensors; (3) a pair sensor(s) option which should appear inactive until the one or more sensor(s) are checked; and (4) a close box which the user can click to return to the home screen (such as the page illustrated on the screen 105 in FIG. 20A-20B described in further detail below).

Figure 20B:
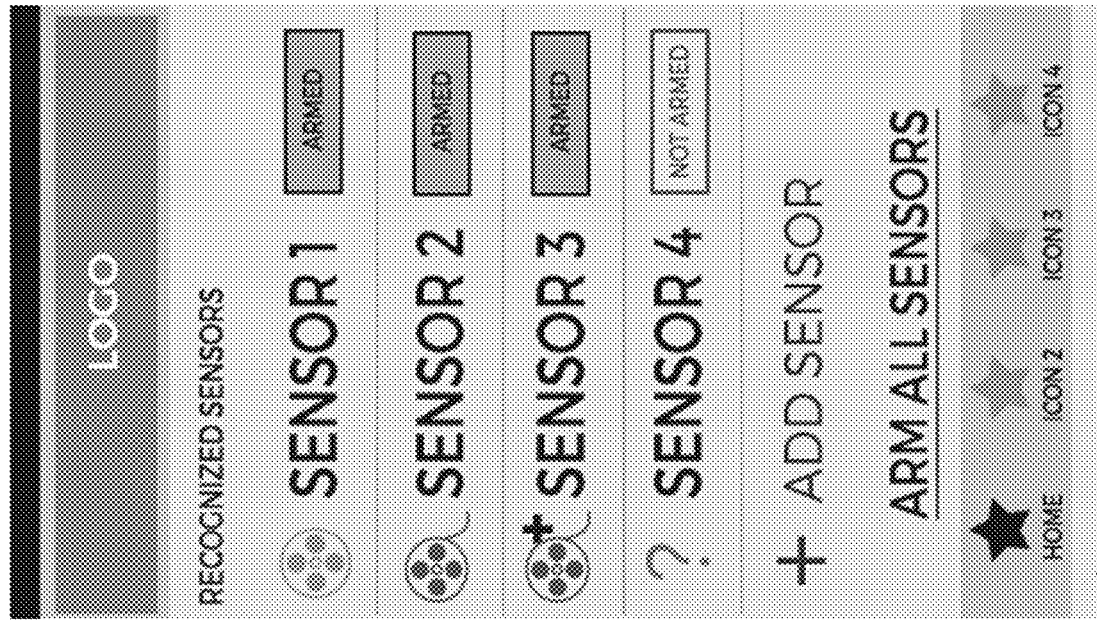
FIG. 20B illustrates another exemplary "Default" page of the app in accordance with the present disclosure where the status of one or more corresponding straps is included.
Figure 20A:
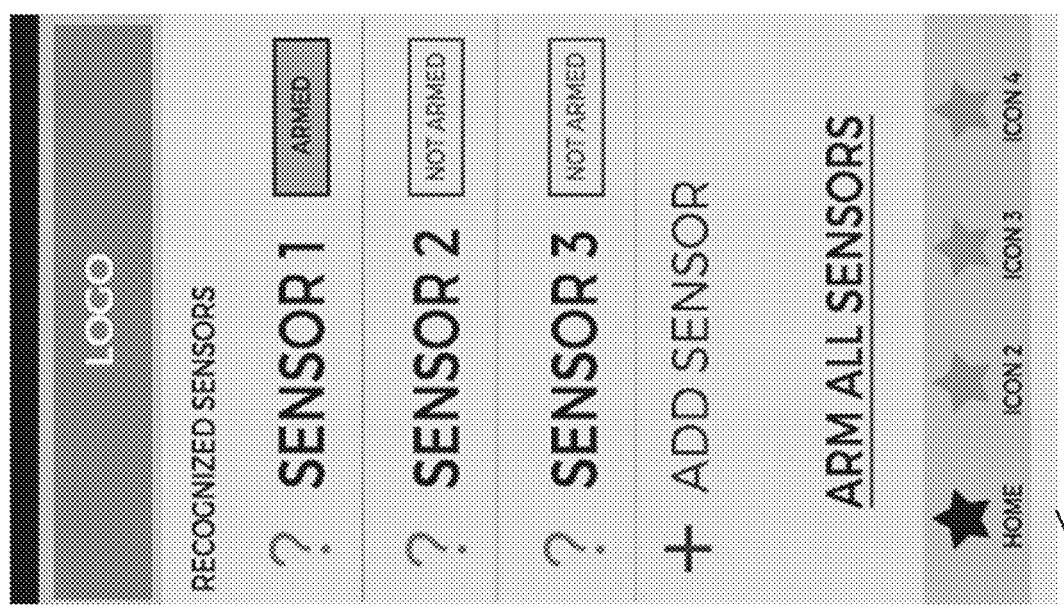
FIG. 20A is an image of the app configured to send and receive data to and from the exemplary strap alarm devices and illustrates an exemplary "Default" page once the app loads, where the status of one or more sensors is included.

FIGS. 20A-20D illustrate non-limiting examples of a default page on screen 105 once the exemplary app loads. In FIG. 20A, an exemplary page is illustrated for a "home" tab or window having the purpose of showing all recognized sensors and their statuses. The information on the exemplary page illustrated in FIG. 19A may include: (1) recognized sensors (i.e., sensor devices) that have been paired with the app, where a user can take the action of clicking the different sensor names in order to change various settings (see the "Sensor Settings" page illustrated in FIGS. 21A and 21B and described in further detail below); (2) an "+Add sensor" option, where any number of strap sensor devices can be added depending on the programming of the app. It should be understood that the particular number of strap alarm devices that may be added to the exemplary app is non-limiting; (3) an "Arm All Sensors" option configured to arm all sensors appearing above the "Arm All Sensors" option (if all sensors are already armed, the app changes this option to an "UN-ARM ALL SENSORS" option (not shown)). If one or more previously paired strap alarm devices are not connected via Bluetooth, for example, those devices should appear with an error on the page illustrated in FIG. 20A and have a status of "not armed"; and (4) an armed status box configured to show one of two statuses depending on whether the strap alarm device has been armed or not. A user can take the action of clicking the armed status box to manually arm or un-arm each sensor individually. Any of the one or more sensors paired with the app automatically appear with the status of "not-armed" if there is an issue with the sensor (see the Sensor Alarms pages illustrated in FIGS. 26A-26B and described in further detail below).

In FIG. 20B, an exemplary page is illustrated showing another example of a home screen which may appear on screen 105. In the embodiment illustrated in FIG. 20B, any previously paired strap sensor devices are shown with one or more corresponding status identifiers. For example, the status of the strap/webbing and the "arm" status are shown. It should be understood that different colors can be used with different icons to identify any change in status. The information on the exemplary page illustrated in FIG. 20B may include (1) an icon identifying whether the webbing is taut; (2) an icon identifying whether the webbing is loose; (3) a webbing icon with a "+" sign to identify that additional issues are present on top of the loose webbing, where a user can take the action of clicking the sensor to see the additional issues (see the "Sensor Settings+Alerts" page illustrated in FIG. 21A and described in further detail below); and (4) an icon such as a question mark which indicates that the webbing cannot be identified as taut or loose, because the corresponding strap sensor device is not armed/being monitored.

Figure 20C:
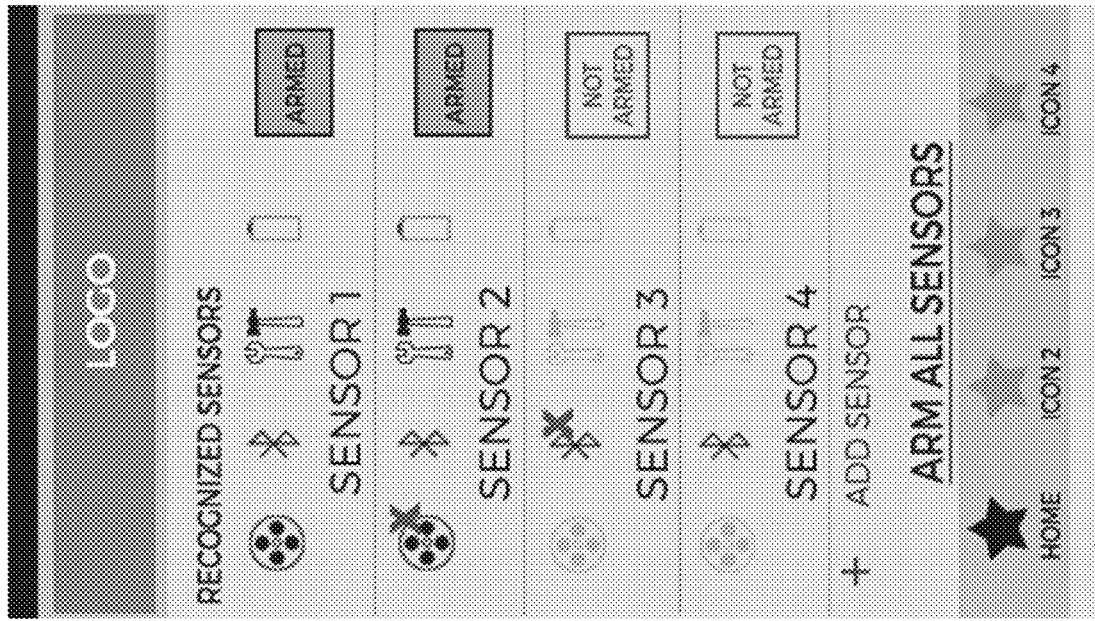
FIG. 20C illustrates another exemplary "Default" page of the app in accordance with the present disclosure where a simplified status of one or more sensors is included.

In FIG. 20C, an exemplary page is illustrated showing another example of a home screen which may appear on screen 105 of a device running the exemplary app. In the embodiment illustrated in FIG. 20C, any previously paired strap sensor devices are shown with one or more corresponding status identifiers. For example, the status identifiers illustrated in FIG. 20C indicate whether there are no issues (i.e., all strap alarm devices are secure) or if there are general issues, where the user would need to click into the sensor to see exactly which issues apply to that sensor. The information on the exemplary page illustrated in FIG. 20C may include: (1) an icon identifying that a corresponding strap alarm sensor device is working properly and is secure (e.g., a "thumbs up" icon); (2) an icon identifying that there is a single issue (e.g., an "X" with the number "1"); (3) an icon identifying that there are multiple issues (e.g., an "X" with a number corresponding to the particular number of issues, such as "3"); and (4) an icon indicating that the app cannot identify if there are any issues with a corresponding sensor because it is not armed/being monitored.

Figure 20D:
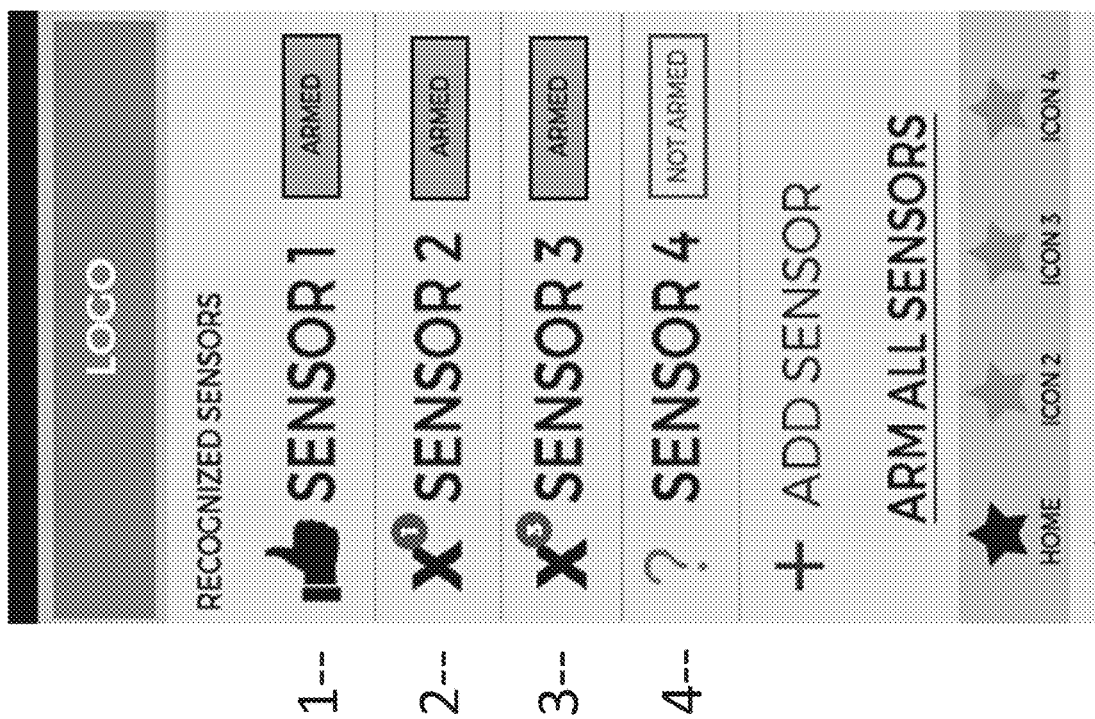
FIG. 20D illustrates another exemplary "Default" page of the app in accordance with the present disclosure where a detailed status of one or more sensors is included.

In FIG. 20D, an exemplary page is illustrated showing another example of a home screen which may appear on screen 105 of a device running the exemplary app. In the embodiment illustrated in FIG. 20D, any previously paired strap sensor devices are shown with one or more corresponding status identifiers. For example, the status identifiers illustrated in FIG. 20D indicate a full status of each sensor that is paired. The information on the exemplary page illustrated in FIG. 20D may include: (1) one or more icons indicating the full status of SENSOR 1, i.e., that SENSOR 1 is armed, secured, and working properly; (2) one or more icons indicating the full status of SENSOR 2, i.e., that SENSOR 2 is armed but there is an issue with the strap (indicated by the first icon at (2) with an adjacent "X" mark); (3) one or more icons indicating the full status of SENSOR 3, i.e., that SENSOR 3 is not armed because there is an issue with Bluetooth (indicated by the second "Bluetooth" icon at (3) with an "X" mark); and (4) one or more icons indicating the full status of SENSOR 4, i.e., that SENSOR 4 is not armed, but could be armed because there is no issue with the Bluetooth (indicated by the highlighted second "Bluetooth" icon at (4) without any additional marks). In some additional embodiments of the exemplary home screen illustrated on screen 105 in FIG. 20D, each of the one or more status identifiers can be configured to be clickable by a user, wherein if a particular status identifier is clicked (e.g., "loose webbing"), the app directs the user to a help section which identifies solutions and/or re-shows the alert.

Figures 21A, 21B:
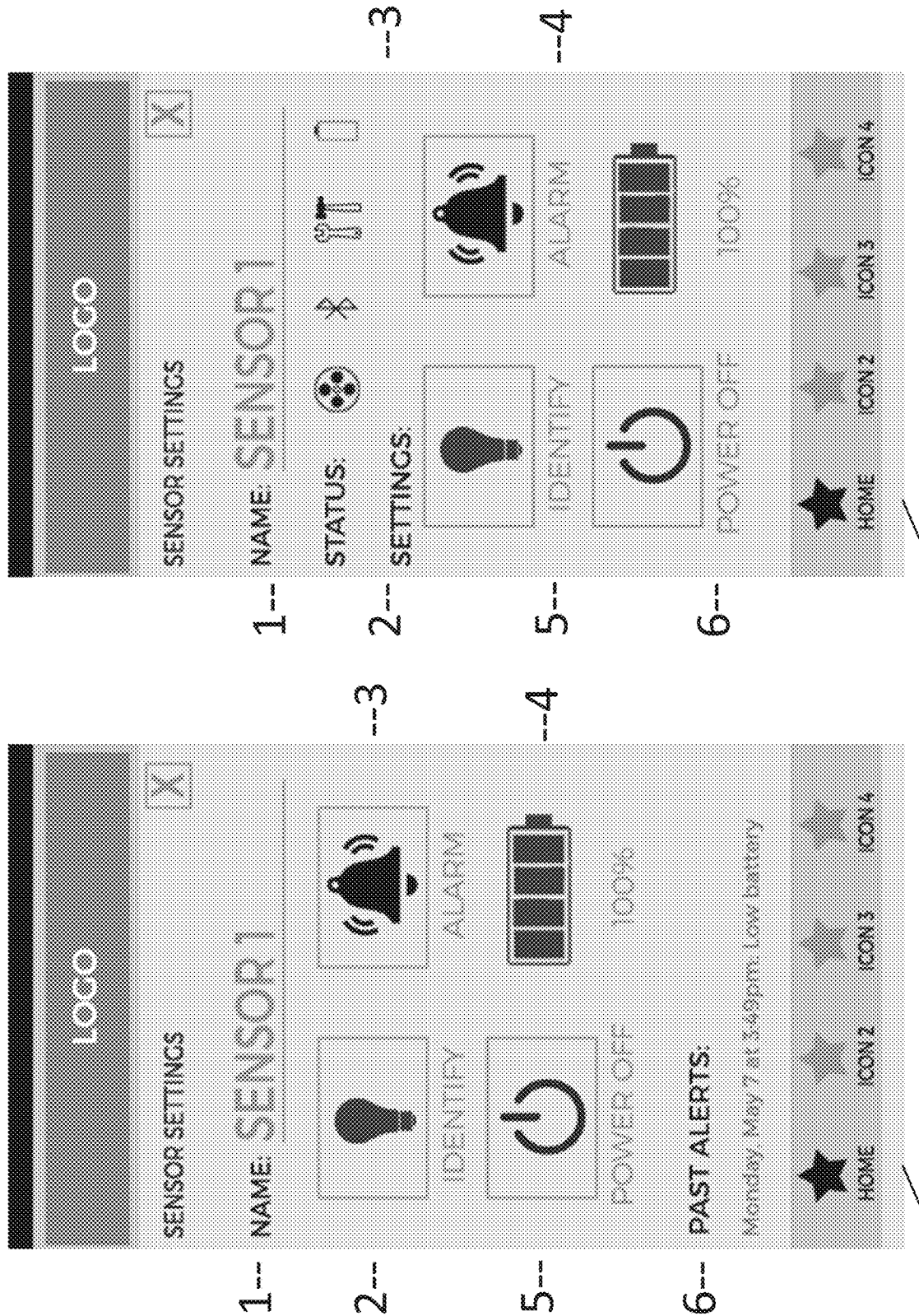
FIG. 21A is an image of the app configured to send and receive data to and from the exemplary strap alarm devices and illustrates an exemplary "Sensor Settings" page of the app in accordance with the present disclosure.
FIG. 21B illustrates another exemplary "Sensor Settings" page of the app in accordance with the present disclosure.

FIGS. 21A and 21B illustrate non-limiting examples of a page that is shown on the screen 105 in the exemplary app when a sensor name is clicked from the home tab or window (such as the home tab or window pages illustrated in FIGS. 20A-20D). In the pages illustrated in FIGS. 21A and 21B, one or more setting options are presented to a user after clicking the sensor name from the home tab. In FIG. 21A, an exemplary page is illustrated showing one or more setting options presented to a user after clicking SENSOR 1. The setting options presented on the exemplary page illustrated in FIG. 21A may include: (1) a "Name" option, where the user can change the name of the sensor by clicking the name, thereby opening a keyboard permitting such an action; (2) an "Identify" icon which can be clicked to illuminate a light on SENSOR 1 such that it can be easily identified; (3) an "Alarm" icon which can be clicked to open another box of options (see the "Alarm Settings" page illustrated in FIG. 22 and described in further detail below); (4) a "Power Off" icon which can be clicked only if the sensor is already on; (5) a "Battery" icon configured to indicate the battery life, which may include a corresponding percentage located below the "Battery" icon; and (6) an optional "Past Alerts" option which can be clicked to identify past scenarios where an alert has been active on SENSOR 1. In some other embodiments of the exemplary "Sensor Settings" page illustrated in FIG. 21A, an "un-pair" option (not shown) may be included to remove the pairing of SENSOR 1 with the app.

In FIG. 21B, an exemplary page is illustrated on screen 105 showing another example of one or more setting options presented to a user after clicking SENSOR 1. The setting options presented on the exemplary page illustrated in FIG. 21B may include: (1) one or more status indicators showing the current status for selected SENSOR 1, where the indicators are optionally configured to be clickable by a user such that whichever status indicator is clicked (e.g., the "loose webbing" icon), the app takes the user to a help section which identifies solutions and/or re-shows the alert. Moreover, in some other embodiments of the exemplary "Sensor Settings" page illustrated in FIG. 21B, an "un-pair" option (not shown) may be included to remove the pairing of SENSOR 1 with the app.

It should be understood that while FIGS. 21A and 21B illustrate an app page with setting options for SENSOR 1, these exemplary setting pages are not limited to only "SENSOR 1". That is, the setting pages in FIGS. 21A and 21B can similarly appear after a user clicks any of the paired sensors on the home tab, such as SENSOR 2, SENSOR 3, etc.

Figure 22:
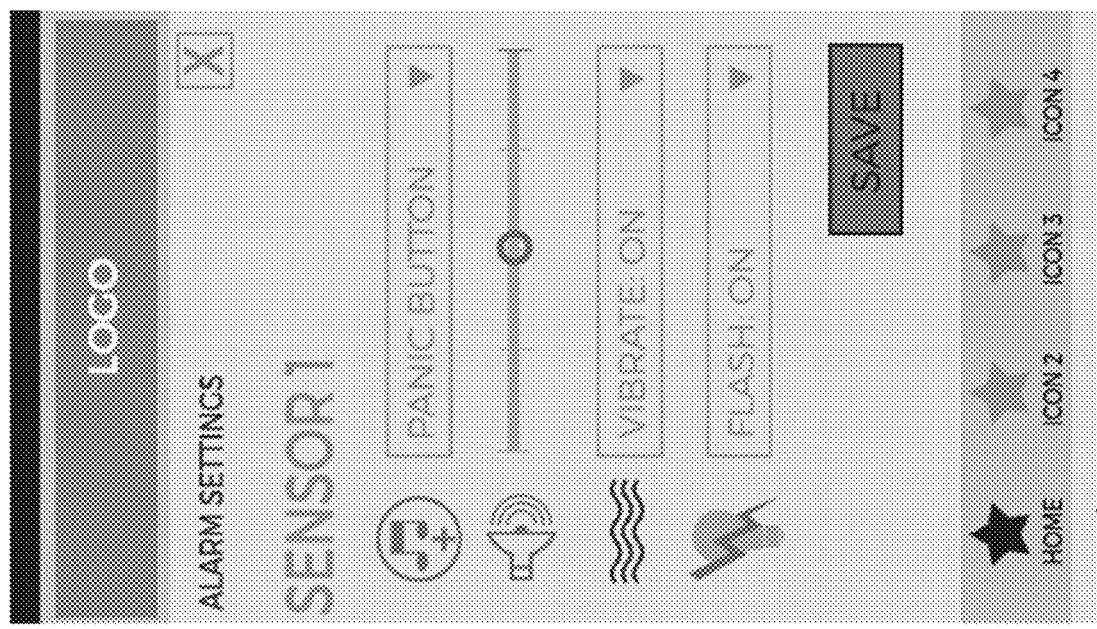
FIG. 22 is an image of the app configured to send and receive data to and from the exemplary strap alarm devices and illustrates an exemplary "Alarm Settings" page of the app in accordance with the present disclosure.

FIG. 22 illustrates a non-limiting example of a page shown on the screen 105 in the exemplary app and configured to permit a user to select different settings for a particular strap alarm device after a sensor name is clicked from the home tab or window. The settings illustrated in FIG. 22 may be based on the individual preference/needs of a particular user. The setting options presented on the exemplary page illustrated in FIG. 22 may include: (1) the name of sensor being edited (e.g., SENSOR 1); (2) an alarm sound option where the user can change the sound of the alarm that is heard; (3) a volume option where the user can override the set-volume of the device running the exemplary (e.g., mobile device 104 in FIG. 15); (4) a vibrate option where the user can turn on/off alarm vibrations; (5) a flash option where a user can choose whether a flashing light should be on or off and to what cadence; and (6) a save option which must be clicked to save any changes made on the page illustrated in FIG. 22. After the "Save" option is clicked on screen 105 illustrated in FIG. 22, the "Save" button at (6) can optionally be "greyed out" and the user can click "X" in the upper-right corner of the screen to return home. Alternatively, after the "Save" option is clicked, the app can immediately return the user to the home screen.

Figure 23:
FIG. 23 is an image of the app configured to send and receive data to and from the exemplary strap alarm devices and illustrates an exemplary "Alert Log" page of the app in accordance with the present disclosure.

FIG. 23 illustrates a non-limiting example of a page shown on the screen 105 in the exemplary app and configured to provide a running list of alerts that a user has received from a particular strap alarm sensor device. Alternatively, the page illustrated in FIG. 23 can provide a running list of all alerts that a user has received from each previously paired strap alarm sensor device. The "running list" of alerts presented on the exemplary page illustrated in FIG. 23 may include information such as: (1) a logged list of alerts for one or every paired device, including the day, date, time, alert label and sensor the alert applies to, where each alert for the one or every paired strap alarm sensor device is listed individually in one long list. In another non-limiting exemplary embodiment of the "running list" alert page illustrated in FIG. 23, the running list of alerts may include information such as: (2) an alert log sorted by day, where each alert is organized under a single date for easier quick reference to a particular date. In addition, the "running list" of alerts page illustrated in FIG. 23 shows an "ALERTS" icon in the tab bar at the bottom of screen 105 which has been highlighted and/or otherwise changed to indicate the user's location in the app (i.e., that the user is currently navigating the "running list" of alerts page in the app).

Figure 24:
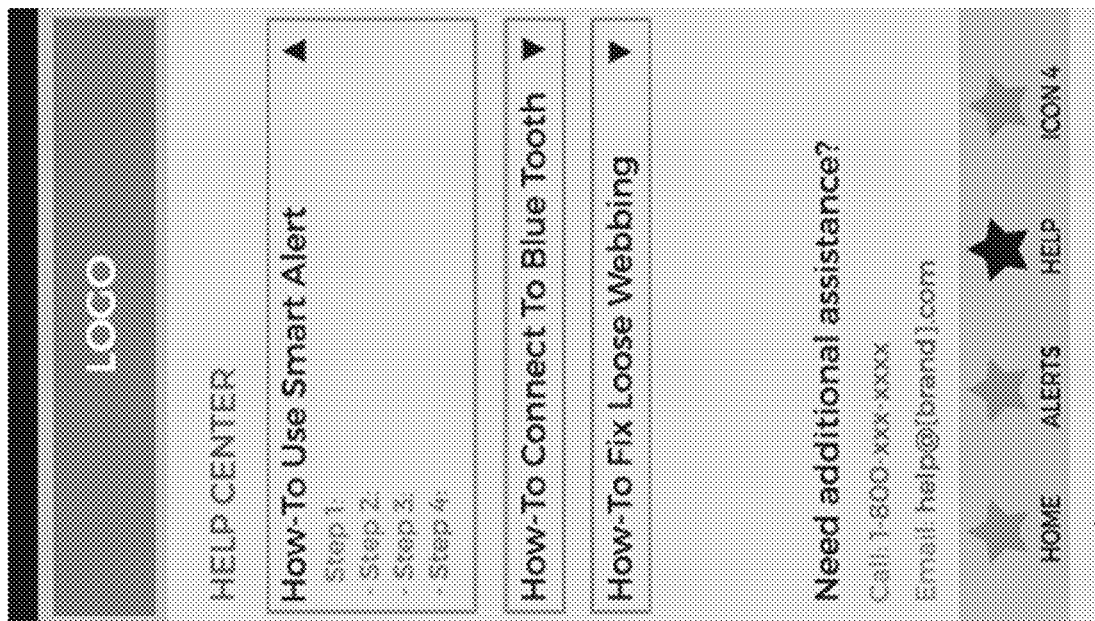
FIG. 24 is an image of the app configured to send and receive data to and from the exemplary strap alarm devices and illustrates an exemplary "Help" page of the app in accordance with the present disclosure.

FIG. 24 illustrates a non-limiting example of a page shown on the screen 105 in the exemplary app and configured to provide self-help to users where troubleshooting can be performed for different issues and quick guides on how to use the app can be presented. The help screen presented on the exemplary page illustrated in FIG. 24 may include information such as: (1) an accordion style layout where different help categories can be expanded to reveal additional options; and (2) a "click to call" and/or "click to email" option configured to provide the user with additional guidance.

Figure 25:
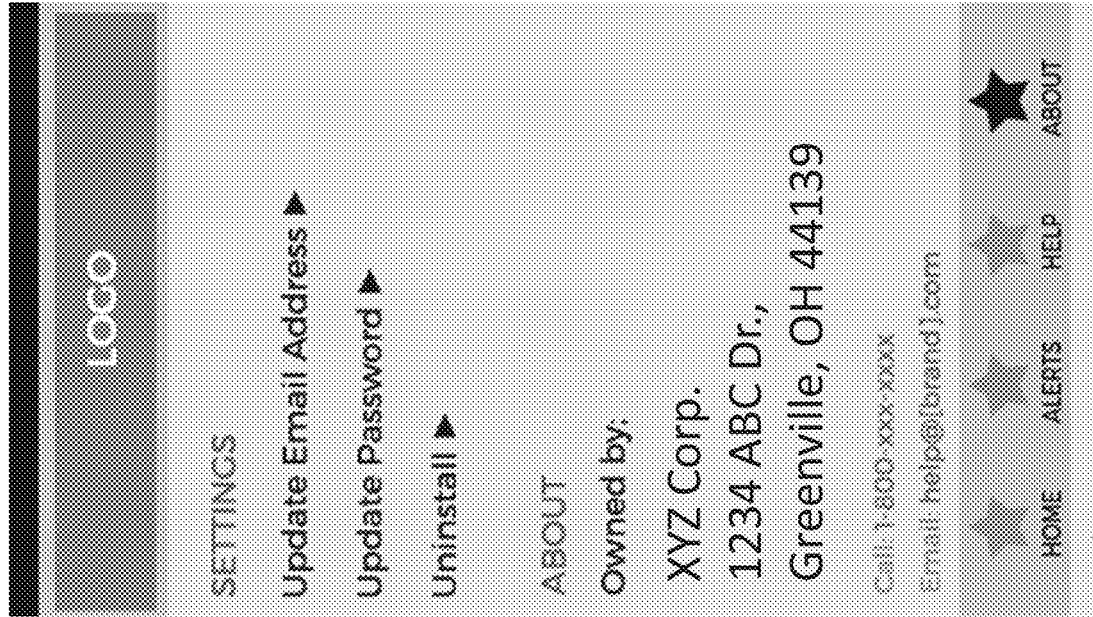
FIG. 25 is an image of the app configured to send and receive data to and from the exemplary strap alarm devices and illustrates an exemplary "General Settings/About" page of the app in accordance with the present disclosure.

FIG. 25 illustrates a non-limiting example of a page shown on the screen 105 configured to provide/permit a user to change the "General Settings" and/or "About" information of the app. In other words, the exemplary page illustrated in FIG. 25 provides a location for a user to update email addresses, uninstall the app, explain who owns the app, etc. The "General Settings" and/or "About" screen presented on the exemplary page illustrated in FIG. 25 may include information such as: (1) an area to update general settings (e.g., email address, password, uninstall, etc.); (2) an area where information about the app's owner can be provided; and (3) an area where the app owner's main contact information can be provided.

Figure 26B:
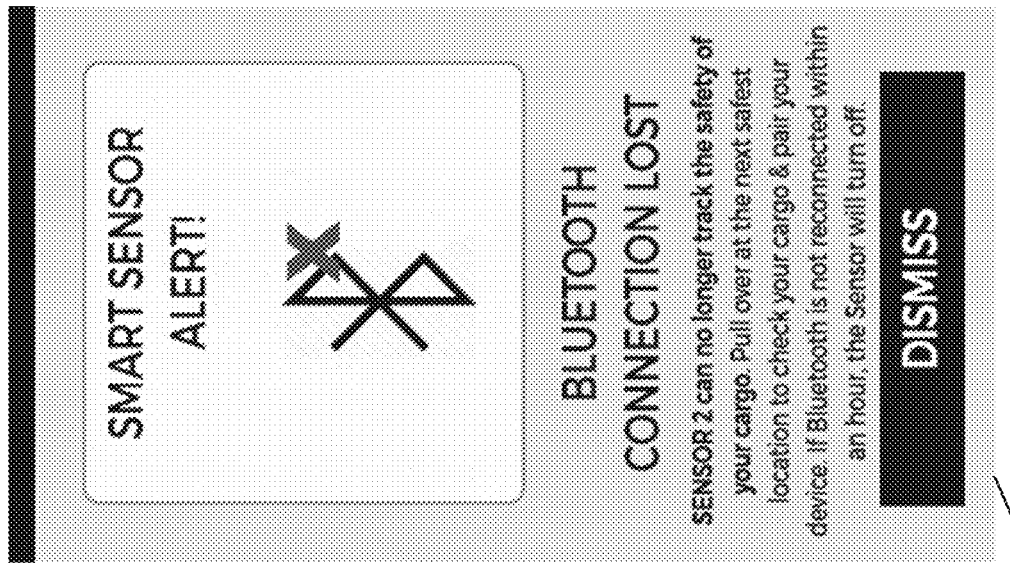
FIG. 26B illustrates another exemplary "Smart Sensor Alert" notification where a "Bluetooth Connection Lost" alert is presented.
Figure 26A:
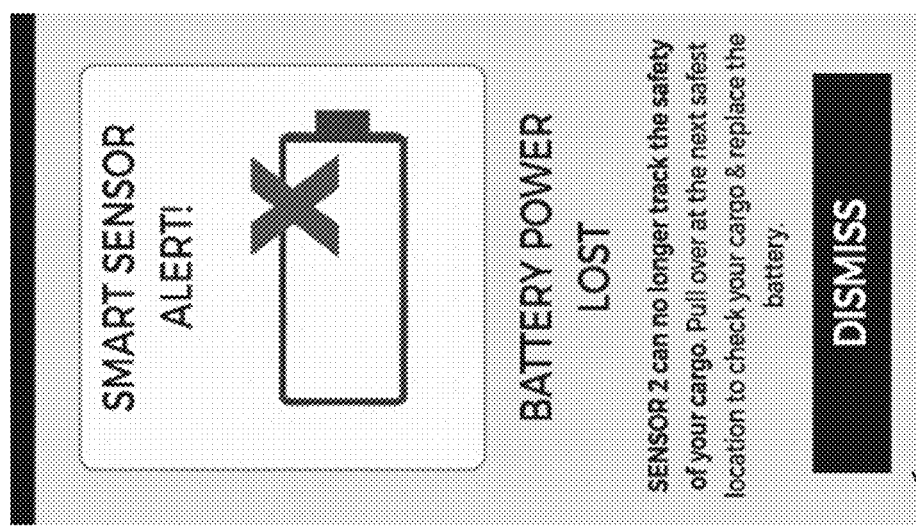
FIG. 26A is an image of the app configured to send and receive data to and from the exemplary strap alarm devices and illustrates an exemplary "Smart Sensor Alert" notification in accordance with the present disclosure where a "Battery Power Lost" alert is presented.

FIG. 26A-26D illustrate non-limiting examples of a page that is shown on the screen 105 in the exemplary app when various exemplary sensor alarms/alerts are triggered. In FIG. 26A, a page is illustrated showing an exemplary low battery alarm where, once a battery gets to a certain battery life percentage, a notification is sent. For example, a first notification can be sent in the banner at the top of the screen 105 when the battery reaches 20% (not shown). As another example, a second notification can take over the screen 105 when a low battery life threshold percentage is reached (e.g., 3% battery life, however the particular threshold is non-limiting and may be based on the preferences of an individual user). The information related to the low battery alarm presented on the exemplary page illustrated in FIG. 26A when the low battery life threshold percentage is reached may include: (1) the alert title (e.g., "Smart Sensor Alert"); (2) an alert graphic (e.g., a battery icon with an "X" mark); (3) an alert description (e.g., "Battery Power Lost"); (4) additional alert detail and guidance, including the name of the particular sensor which triggered the alarm; and (5) a dismiss button configured to close the alarm/alert notification.

In FIG. 26B, an exemplary page is illustrated on screen 105 showing another example of an exemplary sensor alarm/alert notification. In particular, FIG. 26B illustrates an exemplary Bluetooth connection alarm which notifies a user when a Bluetooth connection is lost. In some particular embodiments, the corresponding sensor which triggered a lost Bluetooth connection notification can be configured to automatically shut off if a connection is not made within a certain time frame, such as about 1 to 2 hours. However, the particular time frame for automatic shut-down is non-limiting and may be set based on the preferences of an individual user of the app. For example, as illustrated in FIG. 26B, a notification can take over the screen 105 when a weak Bluetooth connection is sensed and/or the Bluetooth connection is lost. The information related to the Bluetooth connection notification presented on the exemplary page illustrated in FIG. 26B may include: (1) an alert title (e.g., "Smart Sensor Alert"); (2) an alert graphic (e.g., a Bluetooth icon with an "X" mark); (3) an alert description (e.g., "Bluetooth Connection Lost"); (4) additional alert detail and guidance, including the name of the particular sensor which triggered the alarm; and (5) a dismiss button configured to close the alarm/alert notification. Optionally, if a Bluetooth connection is reestablished with the corresponding sensor, the Bluetooth notification can be configured to automatically disappear from the app screen. As another non-limiting Bluetooth notification example, a notification (not shown) can take over the screen when the expiration for the time frame for sensor shut-down is approaching. For example, if a one-hour time-frame is set, once a threshold range of time before the expiration of the time frame is reached, (e.g., from about 5 to 10 minutes and/or from about 1 to 5 minutes before expiration of the one-hour) a notification will take over the screen to remind the user that the sensor will turn off due to inactivity. However, the particular threshold range of time non-limiting and may be set based on the preferences of an individual user of the app.

Figure 26D:
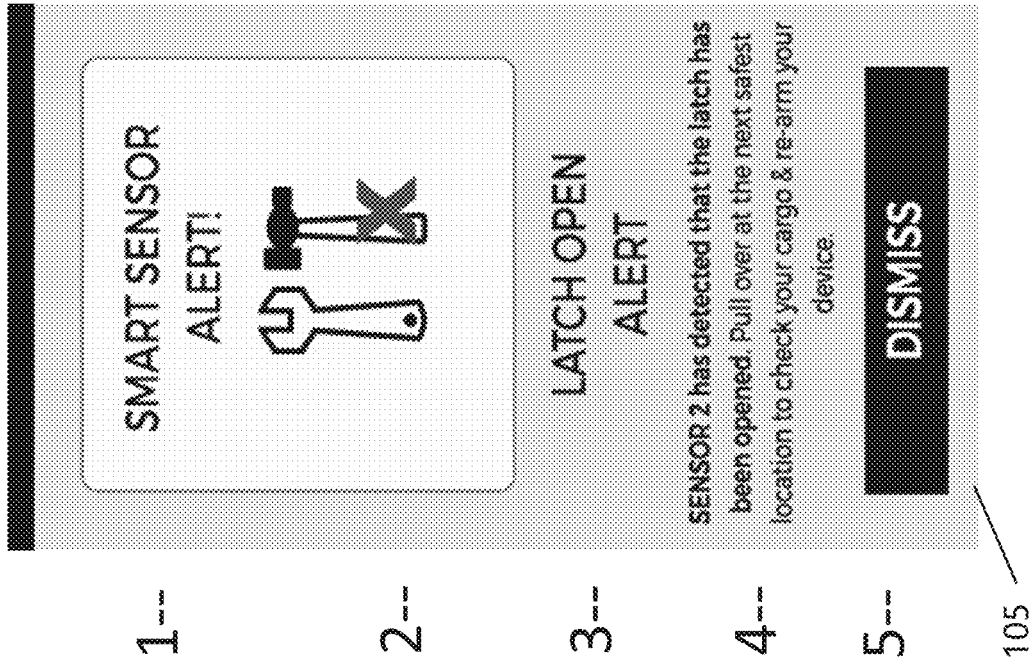
FIG. 26D illustrates another exemplary "Smart Sensor Alert" notification where a "Latch Open" alert is presented; and, FIG. 27 is a schematic diagram of circuitry of an exemplary strap alarm device in accordance with the present disclosure.
Figure 26C:
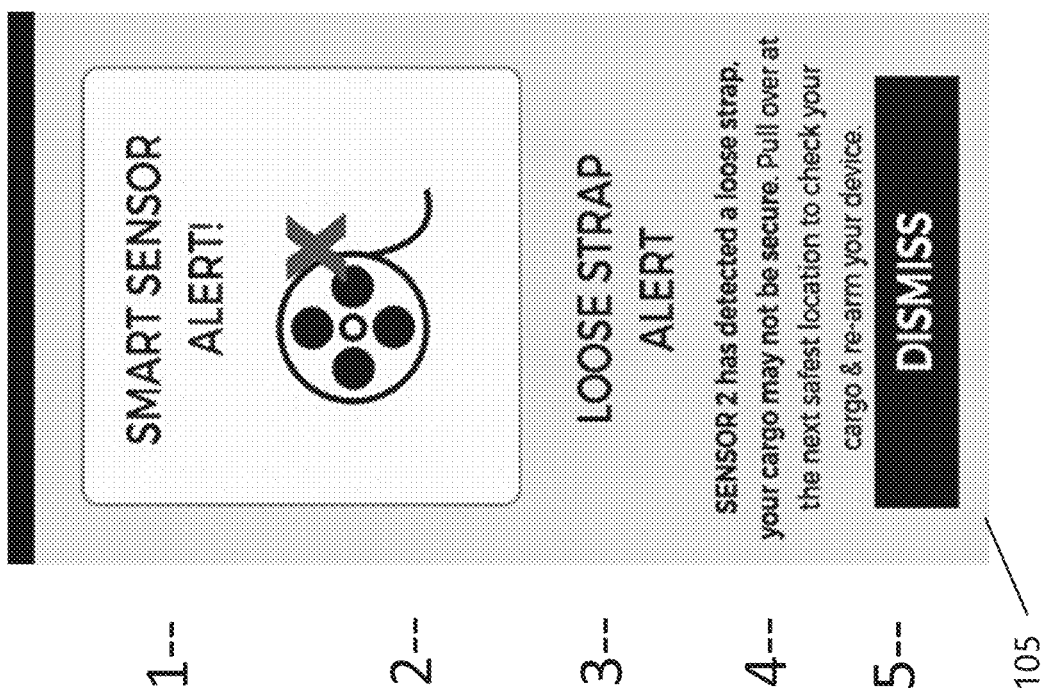
FIG. 26C illustrates another exemplary "Smart Sensor Alert" notification where a "Loose Strap" alert is presented.

In FIG. 26C, an exemplary page is illustrated on screen 105 showing another example of an exemplary sensor alarm/alert notification. In particular, FIG. 26C illustrates an exemplary loose webbing alarm which notifies a user when a sensor identifies a corresponding strap/webbing as being loose. For example, as illustrated in FIG. 26C, a notification can take over the screen 105 when any amount of looseness is sensed in a corresponding strap/webbing. The information related to the loose webbing notification presented on the exemplary page illustrated in FIG. 26C may include: (1) an alert title (e.g., "Smart Sensor Alert"); (2) an alert graphic (e.g., a roll of webbing icon with a lack portion of webbing extending therefrom and an "X" mark); (3) an alert description (e.g., "Loose Strap Alert"); (4) additional alert detail and guidance, including the name of the particular sensor which triggered the alarm; and (5) a dismiss button configured to close the alarm/alert notification. Optionally, if corresponding sensor senses that the webbing has been tightened, the loose webbing notification can be configured to automatically disappear from the app screen.

In, FIG. 26D an exemplary page is illustrated on screen 105 showing another example of an exemplary sensor alarm/alert notification. In particular, FIG. 26D illustrates an exemplary open latch alarm notification configured to tell a user that someone may be trying to tamper with the strap alarm device and/or steal the item being secured by the device. For example, as illustrated in FIG. 26D, a notification can take over the screen 105 when an open latch is sensed in a corresponding strap alarm device. The information related to the open latch notification presented on the exemplary page illustrated in FIG. 26D may include: (1) an alert title (e.g., "Smart Sensor Alert"); (2) an alert graphic (e.g., an icon of tools such as a wrench and hammer with an "X" mark); (3) an alert description (e.g., "Latch Open Alert"); (4) additional alert detail and guidance, including the name of the particular sensor which triggered the alarm; and (5) a dismiss button configured to close the alarm/alert notification. Optionally, if corresponding sensor senses that the latch has been closed, the latch open notification can be configured to automatically disappear from the app screen.

In additional non-limiting embodiments of the app disclosed herein, other exemplary sensor alarms may appear as "banners" (not shown) at the top of the app screen. These banner alarms can be used for less urgent alerts and are configured to notify the user without taking over the screen (such as the alerts illustrated in FIGS. 26A-26D). Examples of less urgent "banner" notifications include but are not limited to: (a) a low battery warning at x %; (2) a weak Bluetooth connection at x %; and (3) a reminder of an alert that has not yet been addressed.

Figure 27:
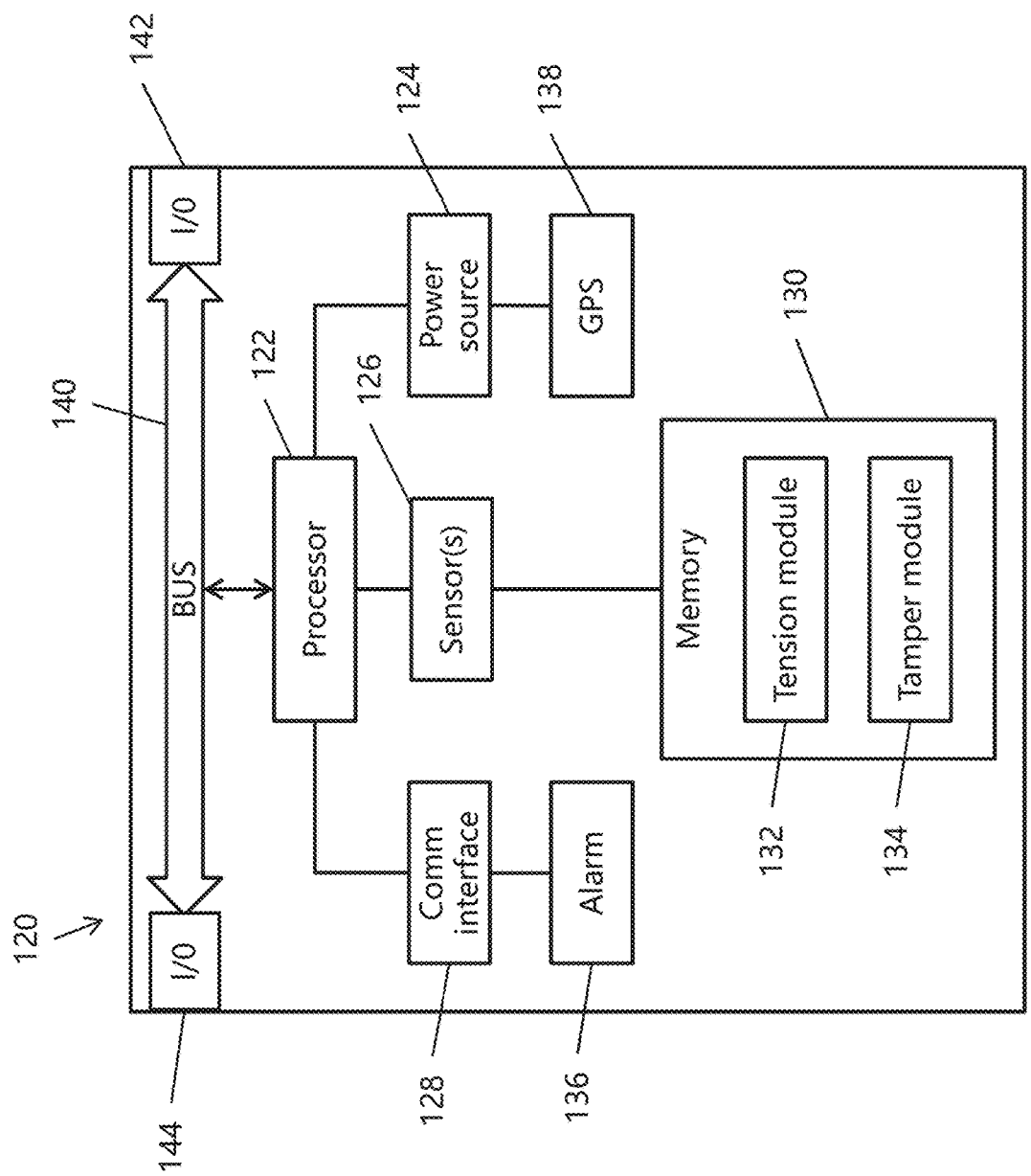

With reference to FIG. 27, a block diagram of exemplary circuitry system of a strap alarm device in accordance with the present disclosure is illustrated and identified generally by reference numeral 120. The circuitry system includes a processor 122 coupled to a power source 124, one or more sensors 126, a communication interface 128 and a memory 130. Stored within memory 130 are a tension module 132 and a tamper module 134. The tension module 132 includes computer-executable instructions for generating a signal indicative of low or no tension in accordance with one or more of the above-described processes. The tamper module 134 includes computer-executable instructions for generating a signal indicative of tampering in accordance with one or more of the above-described processes. As will be appreciated, the processor 122 utilizes data from the sensor(s) 126 to execute either one or both of the tension module 132 or tamper module 134 and communicate signals indicative of low/no strap tension or tampering via communication interface 128. Alarm 136, which can be an audible or visual alarm, can also be activated by the processor 122. GPS circuitry 138 can also be provided for providing position data to allow tracking of the device. One or more input-output ("I/O") devices 142, 144 allow the circuitry system to communicate with external devices, such as a computer (not shown) or a mobile device (such as phone 104 illustrated in FIG. 15). For example, the I/O devices 142, 144 permit the sensor(s) to relay information to the mobile device that may include the notifications illustrated in FIGS. 26A-26D. The one or more input-output components 142, 144 of the circuitry system are communicatively connected by a data/control bus 140. The processor 122 is communicatively connected to the data/control bus 140 such that information related to the processor's execution of the instructions stored in the memory 130 can be input/output via the one or more I/O devices 142, 144.

The exemplary embodiments have been described with reference to the preferred embodiments. Certain modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A device for monitoring a securing member comprising:
   a housing, said housing configured to at least partially engage said securing member, said securing member includes a belt, a chain, a rope, a cord, or a strap;
   a cam latch pivotally supported by the housing, said cam latch configured to rotate between an unlatched and a latched position;
   a compression member including a rod portion coupled to the cam latch, said compression member configured to move linearly upon rotation of the cam latch;
   a sensor including a first switch disposed in the housing, said first switch configured to generate a signal indicative of a tension state of the securing member; and,
   a biasing member, said biasing member configured to compress upon linear movement of the compression member when said cam latch is in said latched position and to activate the first switch when tension of said securing member is reduced.

2. The device of claim 1, wherein the signal is indicative of low and/or no tension in the securing member.

3. The device of claim 1, wherein the sensor further comprises a second switch disposed in the housing, said second switch configured to generate a signal indicative of the cam latch being unlatched or latched.

4. The device of claim 3, further comprising:
a circuitry and a memory disposed inside the housing, said memory includes a tamper module providing computer-executable instructions configured to generate a signal indicative of the cam latch being unlatched or latched; and,
a processor configured to execute the instructions of the tamper module.

5. The device of claim 3, wherein the second switch is held in an open state when the cam latch is in the unlatched position, said second switch configured to generate a signal indicative of the unlatched position.

6. The device of claim 3, wherein the second switch is held in a closed state when the cam latch is in the latched position, said second switch configured to generate a signal indicative of the latched position.

7. The device of claim 6, wherein the rod portion is pivotally coupled at an off-center position of the cylindrical end of the cam latch.

8. The device of claim 1, wherein the housing includes a slot for receiving the securing member.

9. The device of claim 8, wherein the first switch is configured in the closed state when the securing member is received in the slot and the cam latch is in the latched position.

10. The device of claim 1, wherein the compression member compresses the biasing member against the securing member when the cam latch is in the latched position.

11. The device of claim 1, further comprising:
a circuitry and a memory disposed inside the housing, said memory including: a tension module providing computer-executable instructions configured to generate the signal indicative of the tension state of the securing member; and,
a processor configured to execute the instructions of the tension module.

12. The device of claim 1, wherein the rod portion of the compression member pivotally is slidingly received in a bore disposed through the housing.

13. The device of claim 1, wherein one end of the cam latch is generally cylindrical, said cylindrical end being pivotally supported by the housing.

14. The device of claim 1, wherein the biasing member is configured not to activate the first switch when the cam latch is in the latched position unless the securing member is engaged in the housing.

15. A device for monitoring a securing member comprising:
a housing comprising a cam latch configured to attach the device to the securing member, said securing member includes a belt, a chain, a rope, a cord, or a strap; and,
a sensor and circuitry disposed in the housing and being configured to generate a signal indicative of a state of the securing member and a signal indicative of a state of the device,
wherein the sensor includes a first normally open switch held in a closed state when the securing member has tension above a threshold, and the signal indicative of the state of the securing member includes a signal indicative of low and/or no tension in the securing member, and
wherein the sensor includes a second normally open switch held in a closed state when the device is in an armed position and an open state when the device is in an unarmed position, the signal indicative of the state of the device includes a signal indicative of the device being in the unarmed or armed position.

16. A method for monitoring a tension of a securing member comprising:
providing a sensor device, said sensor device includes a housing, a sensor and circuitry, said housing comprising a cam latch configured to rotate between an unlatched and a latched position to removably attach the sensor device to a portion of the securing member, said securing member includes a belt, a chain, a rope, a cord, or a strap, said sensor and said circuitry at least partially disposed in the housing, said sensor and said circuitry configured to generate a signal indicative of a tension state of the securing member, said sensor includes a first normally open switch held in a closed state when the securing member has tension above a threshold tension, said signal indicative of said tension state includes a signal indicative of a tension on the securing member that is below said threshold tension, said housing further comprises a compression member coupled to the cam latch and configured to move a biasing member;
connecting said sensor device to said securing member;
activating said sensor device; and,
remotely monitoring a status of said sensor device by a wireless device, said sensor device configured to wirelessly transmit said signal to said wireless device when said tension on the securing member that is below said threshold tension.

17. The method of claim 16, further comprising controlling the device and monitoring the generated signal indicative of the state of the securing member with an app.

18. A method for monitoring a tension of a securing member comprising:
providing a sensor device, said sensor device includes a housing, a sensor and circuitry, said housing comprising a cam latch configured to rotate between an unlatched and a latched position to removably attach the sensor device to a portion of the securing member, said securing member includes a belt, a chain, a rope, a cord, or a strap, said sensor and said circuitry at least partially disposed in the housing, said sensor and said circuitry configured to generate a signal indicative of a tension state of the securing member, said sensor includes a first normally open switch held in a closed state when the securing member has tension above a threshold tension, said signal indicative of said tension state includes a signal indicative of a tension on the securing member that is below said threshold tension, the sensor device includes a second normally open switch held in held in a closed state when the device is in an armed position and an open state when the device is in an unarmed positioned, the signal indicative of the state of the device includes a signal indicative of the device being in the unarmed or armed position;
connecting said sensor device to said securing member;
activating said sensor device; and,
remotely monitoring a status of said sensor device by a wireless device, said sensor device configured to wirelessly transmit said signal to said wireless device when said tension on the securing member is below said threshold tension.

19. A method for monitoring a tension of a securing member comprising:
providing a sensor device, said sensor device includes a housing, a sensor and circuitry, said housing comprising a cam latch configured to rotate between an unlatched and a latched position to removably attach the sensor device to a portion of the securing member, said securing member includes a belt, a chain, a rope, a cord, or a strap, said sensor and said circuitry at least partially disposed in the housing, said sensor and said circuitry configured to generate a signal indicative of a tension state of the securing member, said sensor includes a first normally open switch held in a closed state when the securing member has tension above a threshold tension, said signal indicative of said tension state includes a signal indicative of a tension on the securing member that is below said threshold tension;

connecting said sensor device to said securing member;

activating said sensor device, said activating said sensor device comprises rotating said cam latch, thereby compressing said biasing member and closing the first switch when the tension of the securing member is above the threshold tension; and, remotely monitoring a status of said sensor device by a wireless device, said sensor device configured to wirelessly transmit said signal to said wireless device when said tension on the securing member is below said threshold tension.

20. A device for monitoring a tension of a securing member comprising:

a housing, said housing including a securing member cavity that is configured to enable at least a portion of said securing member to be positioned and retained in said cavity, said securing member includes a belt, a chain, a rope, a cord, or a strap, said housing a) is formed of only a main body, said main body includes said cavity, said main body includes a cam latch that is connected to a portion of said main body and which cam latch is movable between an open and closed position, said housing in a closed state when said cam latch is in said closed position, said housing in an open state when said cam latch is in said open position, said cam latch configured to entrap said securing member in said cavity when said cam latch is in said closed position, said securing member is fully encircled by said main housing and cam latch while said securing member is positioned in said cavity and said cam latch is in said closed position, or b) includes connectable upper and lower bodies and wherein said cavity is formed between said upper and lower bodies when said upper and lower bodies are connected together, said upper and lower bodies configured to entrap said securing member in said cavity when said upper and lower bodies are connected together, said securing member is fully encircled by said upper and lower bodies when said upper and lower bodies are connected together, said housing in said open state when said upper and lower bodies are not connected together, said housing in said closed state when said upper and lower bodies are connected together;

a biasing member, said biasing member configured to exert force on said securing member when a) said cam latch is positioned in said closed position or b) said upper and lower bodies are connected together, said biasing member configured to not exert force on said securing member when a) said cam latch is positioned in said open position or b) said upper and lower bodies are not connected together;

a sensor disposed in said housing and configured to generate a signal indicative of a state of tension of said securing member when the securing member is at least partially positioned in said cavity and a) said cam latch is positioned in said closed position and said housing is in said closed state, or b) said upper and lower bodies are connected together and said housing is in said closed state, wherein said sensor includes a first switch, said first switch is positioned in a tension state when said securing member has tension above a threshold tension while at least partially positioned in said cavity and said housing is in said closed state, said first switch is positioned in a non-tension state when said securing member has tension below said threshold tension while at least partially positioned in said cavity and said housing is in said closed state; and wherein said sensor generates said signal indicative of said state of tension of said securing member that is below said threshold tension when said first switch is caused to be positioned in said non-tension state by said biasing member applying force to said securing member while said securing member is in a state of tension that is below said threshold tension and while said securing member is at least partially positioned in said cavity and said housing is in said closed state;

wherein said sensor includes a second switch, said second switch positioned in a closed state when said housing is in said closed state, said second switch positioned in an open state when said housing is in said open state, said second switch causing said sensor to generate a signal indicative of the housing being in said open state or said closed state.

21. The device as defined in claim 20, wherein said housing further includes a circuitry system, said circuitry system including a processor and a memory, said memory including a) a tension module providing computer-executable instructions configured to generate said signal indicative of said tension state of said securing member while said securing member is at least partially positioned in said cavity and said housing is in said closed state, said processor configured to execute the instructions of the tension module, and b) a tamper module providing computer-executable instructions configured to generate a signal indicative of whether said housing is in said open or closed state, said processor configured to execute the instructions of the tamper module.

22. The device as defined in claim 21, wherein said circuitry system includes a communication interface configured to communicate with a computer or a mobile device that is positioned remote from said device so as to provide information to said computer or said mobile device regarding a) whether said securing member has tension below said threshold tension while said securing member is at least partially positioned in said cavity and said housing is in said closed state, and/or b) whether said housing is in said open state or closed state.

23. A device for monitoring a tension of a securing member comprising:

a housing, said housing includes a securing member cavity that is configured to enable at least a portion of said securing member to be positioned and retained in said cavity, said securing member includes a belt, a chain, a rope, a cord, or a strap, said housing a) is formed of only a main body, said main body includes said cavity, said main body includes a cam latch that is connected to a portion of said main body and which cam latch is movable between an open and closed position, said housing in a closed state when said cam latch is in said closed position, said housing in an open state when said cam latch is in said open position, said cam latch configured to entrap said securing member in said cavity when said cam latch is in said closed position, said securing member is fully encircled by said main housing and cam latch while said securing member is positioned in said cavity and said cam latch is in said closed position, or b) includes connectable upper and lower bodies and wherein said cavity is formed between said upper and lower bodies when said upper and lower bodies are connected together, said upper and lower bodies configured to entrap said securing member in said cavity when said upper and lower bodies are connected together, said securing member is fully encircled by said upper and lower bodies when said upper and lower bodies are connected together, said housing in said open state when said upper and lower bodies are not connected together, said housing in said closed state when said upper and lower bodies are connected together, said housing further includes a circuitry system, said circuitry system includes a processor and a memory, said memory including a) a tension module providing computer-executable instructions configured to generate said signal indicative of said tension state of said securing member while said securing member is at least partially positioned in said cavity and said housing is in said closed state, said processor configured to execute the instructions of the tension module, and b) a tamper module providing computer-executable instructions configured to generate a signal indicative of whether said housing is in said open or closed state, said processor configured to execute the instructions of the tamper module;

a biasing member, said biasing member configured to exert force on said securing member when a) said cam latch is positioned in said closed position or b) said upper and lower bodies are connected together, said biasing member configured to not exert force on said securing member when a) said cam latch is positioned in said open position or b) said upper and lower bodies are not connected together;

a sensor disposed in said housing and configured to generate a signal indicative of a state of tension of said securing member when the securing member is at least partially positioned in said cavity and a) said cam latch is positioned in said closed position and said housing is in said closed state, or b) said upper and lower bodies are connected together and said housing is in said closed state, wherein said sensor includes a first switch, said first switch is positioned in a tension state when said securing member has tension above a threshold tension while at least partially positioned in said cavity and said housing is in said closed state, said first switch is positioned in a non-tension state when said securing member has tension below said threshold tension while at least partially positioned in said cavity and said housing is in said closed state; and wherein said sensor generates said signal indicative of said state of tension of said securing member that is below said threshold tension when said first switch is caused to be positioned in said non-tension state by said biasing member applying force to said securing member while said securing member is in a state of tension that is below said threshold tension and while said securing member is at least partially positioned in said cavity and said housing is in said closed state.

24. The device as defined in claim 23, wherein said circuitry system includes a communication interface configured to communicate with a computer or a mobile device that is positioned remote from said device so as to provide information to said computer or said mobile device regarding a) whether said securing member has tension below said threshold tension while said securing member is at least partially positioned in said cavity and said housing is in said closed state, and/or b) whether said housing is in said open state or closed state.

* * * * *